US008694035B2

(12) United States Patent
Abedi

(10) Patent No.: US 8,694,035 B2
(45) Date of Patent: *Apr. 8, 2014

(54) COMMUNICATIONS SYSTEM AND METHOD FOR DETERMINING AN EXCLUSION ZONE IN PROXIMITY TO A WIRELESS COMMUNICATIONS SYSTEM

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 738 days.

This patent is subject to a terminal disclaimer.

(21) Appl. No.: 12/336,180

(22) Filed: Dec. 16, 2008

(65) Prior Publication Data

US 2009/0163237 A1    Jun. 25, 2009

(30) Foreign Application Priority Data

Dec. 21, 2007   (GB) .................................. 0725049.1

(51) Int. Cl.
*H04B 7/00* (2006.01)
*H04B 15/00* (2006.01)
*H04W 4/00* (2009.01)

(52) U.S. Cl.
USPC ..................... 455/501; 455/63.2; 455/422.1

(58) Field of Classification Search
USPC ....................... 455/501, 513, 67.13
See application file for complete search history.

(56) References Cited

U.S. PATENT DOCUMENTS

| 5,361,258 | A | * | 11/1994 | Arnold et al. ................. 370/330 |
| 5,412,658 | A | * | 5/1995 | Arnold et al. ................. 370/330 |
| 5,497,503 | A | | 3/1996 | Rydberg et al. |
| 5,511,233 | A | * | 4/1996 | Otten ............................ 455/524 |
| 5,655,217 | A | | 8/1997 | Lemson |
| 6,496,699 | B2 | * | 12/2002 | Benveniste ................. 455/452.1 |
| 7,054,635 | B1 | * | 5/2006 | Ritzen et al. .................. 455/444 |
| 2001/0041569 | A1 | * | 11/2001 | Rahman ........................ 455/436 |
| 2002/0123343 | A1 | * | 9/2002 | Wiedeman et al. ........... 455/429 |

(Continued)

FOREIGN PATENT DOCUMENTS

| JP | 2001-518766 | 10/2001 |
| JP | 2004-260692 | 9/2004 |

(Continued)

OTHER PUBLICATIONS

UK Intellectual Property Office Search Report under Section 17 for corresponding UK Application No. GB0725049.1; date of search Apr. 20, 2008.

(Continued)

*Primary Examiner* — Temesgh Ghebretinsae
*Assistant Examiner* — Devan Sandiford
(74) *Attorney, Agent, or Firm* — Myers Wolin, LLC

(57) ABSTRACT

A method of reducing interference in a first wireless communications system, the first wireless communications system being operable in use to take part in a spectrum assignment process involving at least a second wireless communications system, the method comprising defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process; and varying the local size of a part only of the exclusion zone in dependence on a level of interference inflicted on the first wireless communications system.

24 Claims, 42 Drawing Sheets

(56) References Cited

U.S. PATENT DOCUMENTS

| | | |
|---|---|---|
| 2002/0186710 A1 | 12/2002 | Alvesalo et al. |
| 2002/0191575 A1* | 12/2002 | Kalavade et al. ............. 370/338 |
| 2006/0198339 A1* | 9/2006 | Marinier et al. ............. 370/329 |
| 2006/0223519 A1* | 10/2006 | Yahagi ......................... 455/421 |
| 2006/0286934 A1* | 12/2006 | Kuffner et al. ............... 455/63.1 |
| 2007/0010237 A1* | 1/2007 | Jones et al. ................ 455/422.1 |
| 2007/0042778 A1* | 2/2007 | Keller et al. .................. 455/443 |
| 2007/0140279 A1* | 6/2007 | Yang et al. ................... 370/406 |
| 2007/0274276 A1* | 11/2007 | Laroia et al. .................. 370/338 |
| 2007/0287469 A1 | 12/2007 | Wijting et al. |
| 2007/0291714 A1* | 12/2007 | Laroia et al. .................. 370/338 |
| 2007/0291715 A1* | 12/2007 | Laroia et al. .................. 370/338 |
| 2008/0002648 A1* | 1/2008 | Laroia et al. .................. 370/338 |
| 2008/0019324 A1* | 1/2008 | Matsumoto et al. .......... 370/335 |
| 2008/0031193 A1* | 2/2008 | Laroia et al. .................. 370/331 |
| 2008/0039066 A1* | 2/2008 | Laroia et al. ............... 455/422.1 |
| 2008/0075059 A1* | 3/2008 | Kermoal et al. ............. 370/343 |
| 2008/0233946 A1* | 9/2008 | Henry ........................ 455/422.1 |
| 2008/0247352 A1* | 10/2008 | Martin ......................... 370/319 |
| 2009/0059841 A1* | 3/2009 | Laroia et al. .................. 370/328 |
| 2009/0131057 A1* | 5/2009 | Dimou .......................... 455/436 |
| 2010/0272038 A1* | 10/2010 | Hamalainen et al. ......... 370/329 |
| 2011/0069630 A1* | 3/2011 | Doppler et al. .............. 370/252 |

FOREIGN PATENT DOCUMENTS

| | | |
|---|---|---|
| WO | 95/27381 | 10/1995 |
| WO | 2006/037046 | 4/2006 |
| WO | 2007/122297 | 11/2007 |
| WO | 2008/035287 | 3/2008 |

OTHER PUBLICATIONS

Extended European Search Report and Annex to European Search Report on European Patent Application No. EP 08171674.8-2412, dated Apr. 15, 2009.

Notification of Reasons for Refusal issued for corresponding Japanese Patent Application No. 2008-323596, mailed Oct. 16, 2012, with English translation.

* cited by examiner

COMMUNICATIONS SYSTEM AND METHOD FOR DETERMINING AN EXCLUSION ZONE IN PROXIMITY TO A WIRELESS COMMUNICATIONS SYSTEM

This application claims priority to United Kingdom Application No. 0725049.1 filed on Dec. 21, 2007, the disclosure of which is expressly incorporated herein by reference in its entirety.

The invention relates to a method of, and apparatus for, reducing interference in a first wireless communications system; to a method of operating a controller for use with a first wireless communications system, and to the controller itself; and to a method of, and apparatus for, interacting with a first wireless communications system.

BACKGROUND

Recent studies have focused on the importance of the spectrum management. One of the recent proposals is to share the common pool of spectrum efficiently between multiple radio access networks.

Previously-considered methods for flexible use of spectrum include four different levels of spectrum management techniques in three different time scales: Spectrum Sharing and Coexistence (a couple of hours or days), Long Term (LT) Spectrum Assignment (a couple of minutes), Short Term (ST) Spectrum Assignment (one second) and fast dynamic Channel Allocation (10 ms time scale or even below). One of the entities included in this method is the concept of a gateway, which provides for long term spectrum assignment and some radio resource management (RRM) algorithms. The concept is illustrated in FIG. 1. The gateway is a central entity considered to be in charge of negotiations related to long term spectrum management. It is assumed that the one gateway is assigned to each radio access network (RAN).

The time granularity of spectrum functionalities is shown in FIG. 2. While the three functionalities of Spectrum Sharing and Coexistence, LT Spectrum Assignment and ST Spectrum Assignment are responsible for defining the amount of spectrum available at common spectrum pool and shaping the boundaries of spectrum in a longer time scale, dynamic Channel Allocation divides the final available spectrum determined by ST Spectrum Assignment (e.g. just borrowed from another cell) into radio sub-channels and decides which radio sub-channel would be allocated to which radio entity on a fast "ms" basis in response to radio channel and traffic variation.

In a spectrum-sharing scenario, efficient interference management will play a crucial role in efficient sharing and utilization of spectrum between the trading parties. Severe interference from one system on other system may lead to an inability to share the spectrum. To avoid the interference from one system to another, an exclusion zone has been considered, as shown in FIG. 3. Within an exclusive zone, spectrum sharing or flexible use of spectrum is forbidden to avoid interference from one system to another. For example, the exclusion zone may provide for protection of a satellite receiver as a primary system.

SUMMARY

In a first aspect, there is provided a method of reducing interference in a first wireless communications system, the first wireless communications system being operable in use to take part in a spectrum assignment process involving at least a second wireless communications system, the method comprising defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process; and varying the local size of a part only of the exclusion zone in dependence on a level of interference inflicted on the first wireless communications system.

The spectrum assignment process may comprise the re-assignment of a portion of a spectrum band which has been pre-assigned to one of the first and second wireless communications systems from the one wireless communications system to the other of the first and second wireless communications systems. In other words, where a first spectrum band has been pre-assigned to the first wireless communications system, and a second spectrum band has been pre-assigned to the second wireless communications system, the spectrum assignment process may comprise (for example during negotiations between the first and second wireless communications systems) re-assigning, from one of the first and second wireless communications systems to the other of the first and second wireless communications systems, some or all of the respective first or second pre-assigned spectrum band. By "pre-assigned" it may be meant that the wireless communications system to which the spectrum band has been pre-assigned is licensed for operation within that spectrum band.

Thus, in the exclusion zone, any mobile communications apparatus in communication with one of the first and second wireless communications systems is permitted to operate only within the spectrum band which has been pre-assigned to the one wireless communications system, and is not permitted to operate within a portion of a spectrum band which has been re-assigned to the one wireless communications system from another wireless communications system as part of the spectrum assignment process. Outside of the exclusion zone, the mobile communications apparatus may operate within the spectrum band which has been pre-assigned to the wireless communications system with which the mobile communications apparatus is in communication, and/or within a portion of a spectrum band which has been re-assigned to that wireless communications system from another wireless communications system as part of the spectrum assignment process. In other words, flexible spectrum sharing may take place outside of the exclusion zone, but not within the exclusion zone.

By "spectrum" there may be meant radio frequencies or any other range of frequencies of electromagnetic radiation suitable for communication. For example, the first and second wireless communications systems may be radio access networks (RANs) operating within the radio frequency range of the electromagnetic spectrum. Additionally or alternatively, the wireless communications systems may operate within a microwave frequency range, for example.

The term "wireless communications system" may relate to a wireless access network, for example a radio access network (RAN), including all of the elements of the network, for example base stations. Additionally or alternatively, it may relate to communications apparatus, for example a network element, e.g. a base station. In another arrangement, it may relate to an RFID tag reader, to a sink or wireless sensor network base station, or to a group of such readers forming a network, possibly including other equipment, e.g. control circuitry.

The term "mobile communications apparatus" may relate to wireless equipment which is capable of undertaking wireless communications with one or both of the wireless communications systems. For example, the term may relate to user equipment (user-portable wireless equipment), for example a mobile telephone, personal digital assistant, laptop or PC, to an RFID tag/node or wireless sensor node.

The exclusion zone is located in proximity to the first wireless communications system in order to protect that system from interference caused by the use of re-assigned portions of spectrum, as described above. To achieve this, the exclusion zone may fully or partially surround the first wireless communications system. For example, it may surround a wireless access network as a whole, or it may surround a part of the first wireless communications system, e.g. a network element (for example a base station) of a wireless access network. Instead, it may be the case the exclusion zone is located adjacent the first wireless communications system, or in any area from where wireless communication between the mobile communications apparatus and the second wireless communications system (using a portion of spectrum assigned from the first communication system) is likely to inflict interference on the first wireless communications system.

The method may provide for intelligent exclusion zone adjustments in a spectrum sharing scenario, providing means to assist spectrum sharing and co-existence among multiple systems, and providing interference protection to the first wireless communications system whilst allowing sharing of the same spectrum in surrounding geographical areas. In one arrangement, the first wireless communications system may be arranged to communicate with an exclusion zone controller. In another arrangement, the exclusion zone controller may form part of the first wireless communications system. A request for a change in the size of the exclusion zone may come from the first wireless communications system, the second wireless communications system, or the exclusion zone controller. For example, when the first wireless communications system is heavily loaded and in red (i.e. high interference), it may request the exclusion zone controller for an expansion of the exclusion zone in order to reduce interference, as an impact of the spectrum sharing process for the systems outside. On the other hand, when the first wireless communications system is cold, (low interference), it may be possible to shrink the exclusion zone for better and more efficient spectrum sharing, allowing other wireless entities outside the first wireless communications system to move closer and use more spectrum resources. The exclusion zone controller may get in touch with the second wireless communications system and may perform exclusion zone adjustments in response to a request from the second wireless communications system, leading to overall better traffic management in a system having multiple wireless communications systems. The shrinking exclusion zone may make it possible for the second wireless communications system to exploit higher transmission powers in the shared spectrum band leading to better QoS (Quality of Service) in the second wireless communications system.

The invention may provide benefits for network operators. For example, the invention may improve the revenue for the borrowing party by making sure that the wireless resource is available when needed in peak times, and may provide an extra source of income for operators as the lending party by making sure that the redundant spectrum is not wasted and can be employed in an efficient way. The technical solution provided by the invention may improve the way spectrum is being managed in current legacy networks, and reduce the time required to tailor new services to network operators. On a cooperative basis, the invention opens the way for a much better flexible exploitation of radio spectrum resources in a wireless network while significantly improving the spectrum efficiency and availability.

In summary, the invention provides for more flexible use of spectrum, improved QoS, improved overall network coverage, reduced delivery delay, increased throughput, and reduced potential for call blockage, especially at cell edges. It may simultaneously improve overall radio sub-channel utilisation while improving the interference level, and provide effective means to improve interference protection to the first wireless communications system whilst allowing sharing of the same spectrum in surrounding geographical area. The invention may provide for further fine tuning to long-term and short-term spectrum assignment, and improve the traffic delivery rate in the wireless networks engaged in a spectrum sharing and coexistence process.

The method may include using any suitable means of indicating the size of the exclusion zone to radio equipment within the zone. In one arrangement, the method comprises transmitting from the first wireless communications system a local beacon signal the strength of which indicates the local size of the part of the exclusion zone, and adjusting the strength of the local beacon signal in order to vary the local size of the part of the exclusion zone. In another arrangement, the method comprises indicating the size of the exclusion zone on a map which is accessible by mobile communications apparatus. In yet another arrangement, the method comprises indicating the size of the exclusion zone by transmitting coordinates indicating a boundary of the exclusion zone. The mobile communications apparatus may determine its position relative to the exclusion zone using a positioning system, such as a satellite positioning system.

The method may include using any suitable means of obtaining the level of interference. In one arrangement, the method comprises calculating a difference between a measured level of interference and a maximum acceptable level of interference, and varying the local size of the part of the exclusion zone in dependence on the difference. In another arrangement, the method includes varying the size of the exclusion zone in dependence only on a measured level of interference (i.e. without reference to a maximum acceptable level of interference). The method may include measuring the level of interference. This may comprise the base station which is issuing a portion of spectrum measuring (or estimating) the signal-to-interference level (SIR) immediately before and immediately after the borrowing party (e.g. a RAN or BS) switches to the assigned portion of spectrum. The assigning base station may then compare the SIR values and calculate the difference. It can then say how much additional interference or SIR loss it has suffered within the shared band. The invention assumes that the capability to measure/estimate interference or SIR already exists in the base station. The maximum acceptable level of interference may be obtained in any suitable way. For example, the method may include storing a predefined maximum acceptable level of interference. The predefined maximum acceptable level of interference may be obtained in a measurement campaign before operation of the first wireless communications system. In another arrangement, the method includes calculating a current maximum acceptable level of interference. The current maximum tolerable or acceptable level of interference depends on the grade of service provided by the system operators (e.g. premium services). Operators of for example Fixed Satellite Services (FSS) might carry out some tests on the Quality of Service they provide for their subscribers, in the presence of different levels of interference (artificially created by operators in the spectrum of interest which is to be shared by other systems), to find out whether they still achieve the target QoS. The threshold of maximum tolerable interference may be set in accordance with a drop below an acceptable level of QoS for the current grade of system.

As explained above, it may be the case that decisions as to the size of the exclusion zone are made outside of the first wireless communications system, for example by the exclusion zone controller. In this case, the method may comprise transmitting from the first wireless communications system a request for a variation of the local size of the part of the exclusion zone to external circuitry. The external circuitry may be the exclusion controller. As explained above, it is most likely that the first wireless communications system transmits a request for an increase in the size of the exclusion zone, in order to protect the first wireless communications system from interference from the second wireless communications system. However, in the situation that interference levels are low, the method may include requesting a decrease in the size of the exclusion zone, in order to generate revenue by sharing spectrum.

In the case that decisions as to the size of the exclusion zone are made outside of the first wireless communications system, for example by the exclusion zone controller, it is useful for the exclusion zone controller to have an indication of the level of interference inflicted on the first wireless communications system. Accordingly, the method may comprise transmitting from the first wireless communications system to external circuitry a signal which is indicative of the level of interference inflicted on the first wireless communications system. The external circuitry may be the exclusion zone controller or the second wireless communications system. The method may include transmitting the signal in response to a request, received for example from the external circuitry, for an indication of the level of interference. In another arrangement, the method includes transmitting the signal periodically. In yet another arrangement, the method includes transmitting the signal in response to a change in a measured level of interference.

The method may include determining a desired size of the exclusion zone (particularly in the case that the exclusion zone controller forms part of the first wireless communications system) and/or, in the case that decisions as to the size of the exclusion zone can be made outside of the first wireless communications system, receiving a signal which is indicative of a desired size of the exclusion zone from external circuitry. For example, the method may comprise receiving from external circuitry (e.g. the exclusion zone controller) a signal which is indicative of a desired local size of the part of the exclusion zone, and varying the local size of the part of the exclusion zone to match the desired local size. In another arrangement, the method includes receiving a signal which is indicative of a desired change in the local size of the part of the exclusion zone, and varying the local size of the part of the exclusion zone in accordance with the desired change. In yet another arrangement, the method includes receiving a signal which is indicative of a desired strength of the local beacon signal, and varying the strength of the local beacon signal to match the desired strength. In still another arrangement, the method includes receiving a signal which is indicative of a desired change in the strength of the local beacon signal, and varying the strength of the local beacon signal in accordance with the desired change.

In the case that the exclusion zone controller forms part of the first wireless communications system, i.e. decisions as to the size of the exclusion zone are made within the first wireless communications system, the method may include appropriately adjusting the local size of the part of the exclusion zone in response to the level of interference. In one arrangement, the method comprises increasing the local size of the part of the exclusion zone in response to an increase in the level of interference and decreasing the local size of the part of the exclusion zone in response to a decrease in the level of interference.

The method may include any suitable means of determining an appropriate size of the exclusion zone based on the level of interference. In one arrangement, the method comprises storing a predefined mapping table of the level of interference against the local size of the part of the exclusion zone, and using the mapping table to vary the local size of the part of the exclusion zone in dependence on the level of interference. In another arrangement, the method comprises storing a predefined mapping table of the level of interference against the strength of a local beacon signal, and using the mapping table to vary the strength of the local beacon signal in accordance with the level of interference. The method may comprise defining the mapping table. One possibility is to adopt an experimental approach to define the mapping table. For any specific fixed level of transmission power from the borrowing system (this can be a mimic test interferer creating the impact of interference from the borrowing system), the QoS of the system of interest (say an FSS system which is the lender) is measured (say for example in terms of Packet Dropping Ratio) and then the strength of the beacon signal is adjusted to reduce the impact of interference until a threshold of acceptable QoS for that specific transmission power level is obtained. In yet another arrangement, the method comprises calculating the local size of the part of the exclusion zone in dependence on the level of interference using an algorithm. For example, the algorithm described above (in relation to the definition of the mapping table) can be applied to a live network. Rather than a look-up table the algorithm described above may adjust the size of exclusion zone in a dynamic and live manner in response to the interference level. So the mimic test interferer employed above would be replaced with the borrowing RAN (real live network).

As described below, there may be situation in which the second wireless communications system requests confirmation of an estimated level of the interference which the second wireless communications system inflicts on the first wireless communications system. In this case, the method may include confirming or otherwise an estimated level of interference inflicted on the first wireless communications system by the second wireless communications system, in response to a request for such confirmation received from the second wireless communications system. This may be done after measuring the level of interference.

It is possible that the interference inflicted on the first wireless communications system will be inflicted by the second wireless communications system (i.e. by communication between a mobile communication apparatus and the second wireless communications system). I.e. the main source of interference is likely to come from communications between user equipment located near the perimeter of the exclusion zone and a radio access network which has borrowed spectrum from the network (or cell) protected by the exclusion zone, where the communications take place using the borrowed spectrum. A superposition of all the interference from radio entities in the granted band may be considered as the total increase in interference or loss of SIR in the base station or satellite ground station protected by the exclusion zone. For example, if a fixed satellite system (FSS) grants part of its spectrum to a surrounding 3G UMTS RAN, it is assumed that the FSS ground station is capable of determining or estimating how much interference increase or SIR loss it receives from all the radio entities that just started to operate in the granted part of the FSS spectrum band.

A number of RANs may be assigned to an exclusion zone controller, which RANs may be sharing or non-sharing RANs. These may include any RAN or wireless network or device which may be affected by sharing spectrum. For example, if spectrum is shared within the Industrial, Scientific and Medical (ISM) band, there may be many small micro-networks operating within the neighbourhood of the granting network. In that case, only a few of them may be involved in the sharing process, although the rest would be affected by the sharing. The exclusion zone controller may communicate with any network which has been assigned to it. Any one of the networks involved may ask for a change in the size of the exclusion zone regardless of whether it is a borrower or lender or neither based on the signal-to-interference level (SIR) or interference profile it experiences. Different networks may have higher priority. For example, the FSS in the above example may have a higher priority than borrowing or non-sharing RANs.

When measuring interference, the primary focus is on the borrowed spectrum. For example, the rise or fall of interference or SIR in say an FSS may be exclusively monitored within parts of the satellite band currently being shared. A secondary concern is the surrounding band it may be of interest how much interference there is from the shared part of spectrum to the non-shared part.

Varying the local size of the part of the exclusion zone may comprise varying the size of the exclusion zone non-uniformly around the perimeter of the exclusion zone. Additionally, or alternatively, varying the local size of the part of the exclusion zone may comprise moving one or more portions of the perimeter of the exclusion zone towards or away from a central region of the exclusion zone. The method may include moving the said one or more portions independently of other portions of the perimeter.

Varying the local size of the part of the exclusion zone may comprise dynamically varying the local size.

In a second aspect, there is provided a method of operating a controller for use with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the method comprising receiving a signal which is indicative of a level of interference inflicted on the first wireless communications system;

determining, in dependence on the level of interference, a desired local size of a part of the exclusion zone;

transmitting to the first wireless communications system a signal which is indicative of the desired local size of the part of the exclusion zone.

Thus, there is provided a means of determining and communicating a desired local size of the exclusion zone from outside of the first wireless communications system, such that the first wireless communications system is able to modify the local size of the part of the exclusion zone to match the desired local size.

Determining the desired local size of the part of the exclusion zone may comprise increasing the desired local size of the part of the exclusion zone in response to an increase in the level of interference and decreasing the desired local size of the part of the exclusion zone in response to a decrease in the level of interference.

The method may comprise storing a predefined mapping table of the level of interference against the desired local size of the part of the exclusion zone, and using the mapping table to determine the desired local size of the part of the exclusion zone.

In one arrangement, determining the desired local size of the part of the exclusion zone comprises determining a desired strength of a local beacon signal. In this arrangement, transmitting to the first wireless communications system the signal which is indicative of the desired local size of the part of the exclusion zone may comprise transmitting a signal which is indicative of the desired strength of the local beacon signal. In another arrangement, transmitting the signal which is indicative of the desired local size of the part of the exclusion zone may include transmitting a signal, which is indicative of a location of a boundary of the exclusion zone on a map. In yet another arrangement, transmitting the signal may include transmitting a signal which is indicative of coordinates of a boundary of the exclusion zone.

In one arrangement, receiving the signal which is indicative of the level of interference comprises receiving a signal which is indicative of a measured level of interference inflicted on the first wireless communications system. The method may further comprise calculating a difference between the measured level of interference and a maximum acceptable level of interference. In another arrangement, receiving the signal which is indicative of the level of interference comprises receiving a signal which is indicative of a calculated difference between a measured level of interference and a maximum acceptable level of interference. In either of these arrangements, determining the desired local size of the part of the exclusion zone may comprise making the determination independence on the calculated difference. In another arrangement, determining the desired local size of the part of the exclusion zone may be done in dependence only on a measured level of interference (i.e. without reference to a maximum acceptable level of interference).

In one arrangement, the method comprises storing a predefined maximum acceptable level of interference obtained in a measurement campaign before operation of the first wireless communications system. Another arrangement includes calculating a current maximum acceptable level of interference.

The method may include storing a predefined mapping table of the level of interference against the strength of a local beacon signal, and using the mapping table to determine a desired strength of the local beacon signal in dependence on the level of interference. In one arrangement, the method includes defining the mapping table.

The method may comprise requesting the signal which is indicative of the level of interference inflicted on the first wireless communications system to be transmitted to the controller. The signal may be received from one or both of the first and second wireless communications systems, or from another source. In one arrangement, the method includes periodically sending the request. In another arrangement, the signal may be requested in response to a request for a change in the local size of the part of the exclusion zone received from one or both of the first and second wireless communications systems. In yet another arrangement, the method includes requesting the signal from the first wireless communications system. Additionally or alternatively, the method may include requesting the signal from the second wireless communications system.

The method may include requesting the second wireless communications system to provide an estimation of the interference it is inflicting on the first wireless communications system. The estimation may be requested in response to a request for a change in the size of the exclusion zone from the second wireless communications system. In another arrangement, the method includes receiving an estimated level of interference which the second wireless communications system is inflicting on the first wireless communications system, e.g. without the estimation having been requested. In either of these arrangements, the desired local size of the part of the exclusion zone may be determined in dependence on the estimated level of interference.

In the case that the second wireless communications system estimates the level of interference it is inflicting on the first wireless communications system, the second wireless communications system may request the first wireless communications system for confirmation of the estimation. In this case, the method may include receiving an estimation from the second wireless communications system of the level of interference inflicted on the first wireless communications system by the second wireless communications system, wherein the estimation has been confirmed by the first wireless communications system, and wherein determining the desired local size of the part of the exclusion zone comprises making the determination in dependence on the confirmed estimation of the level of interference.

In one arrangement, the method includes calculating a difference between the level of interference inflicted on the first wireless communications system by the second wireless communications system and a maximum acceptable level of interference on the first wireless communications system. The method may include storing the maximum acceptable level of interference and/or calculating the current maximum acceptable level of interference.

Determining a desired local size of the part of the exclusion zone may comprise determining a desired variation in the size of the exclusion zone which is non-uniform around the perimeter of the exclusion zone. Additionally, or alternatively, determining a desired local size of the part of the exclusion zone may comprise determining a desired movement of one or more portion of the perimeter of the exclusion zone towards or away from a central region of the exclusion zone. The method may comprise determining the desired movement of the said one or more portions independently of other portions of the perimeter.

In a third aspect, there is provided a method of interacting with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the method comprising
transmitting a request for a variation of the local size of a part of the exclusion zone.

The request may be transmitted from the second wireless communications system or from a third wireless communications system, or both.

In this way, the second/third wireless communications system is able to influence the determination of the local size of the part of the exclusion zone, which may be advantageous for example in the case that network traffic is high in the second wireless communications system. In this case, the second wireless communications system may request a reduction in the local size of the part of the exclusion zone, such that use can be made of a portion of the spectrum band which has been pre-assigned to the first wireless communications system, and re-assigned to the second wireless communications system in the spectrum assignment process, over a greater geographical area.

The method may include transmitting the request to an exclusion zone controller, or to the first wireless communications system, or both.

In the case that the second wireless communications system is not able to make full use of the spectrum being shared by the first wireless communications system, because the local size of the exclusion zone is too large, the method may include requesting a reduction in the size of the exclusion zone.

In some situations, the method may include estimating, in the second wireless communications system, the interference which the second wireless communications system is inflicting on the first wireless communications system. The estimation may be carried out in response to a request for the estimation from the exclusion zone controller. The method may include sending the estimation from the second wireless communications system to the first wireless communications system, and/or to the exclusion zone controller, optionally with a request for confirmation. The method may further include receiving the confirmation at the second wireless communications system from the first wireless communications system and sending the confirmation to the exclusion zone controller. Additionally or alternatively, the method may include sending an estimation from the second wireless communications system to the exclusion zone controller without confirmation. The confirmation may be taken into account to improve the precision and make the measurement more accurate and reliable. It may be the case that exclusion zone size calculations are based on only one of the estimation and the measured value, which may be more feasible, simple and practical. The problem is that the estimated interference might not be accurate enough in some circumstances, say for the operators of an FSS network.

In a fourth aspect, there is provided apparatus for reducing interference in a first wireless communications system, the first wireless communications system being operable in use to take part in a spectrum assignment process involving at least a second wireless communications system, the apparatus comprising
exclusion zone circuitry configured to define an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process;

wherein the exclusion zone circuitry is configured to vary the local size of a part of the exclusion zone in dependence on a level of interference inflicted on the first wireless communications system.

The apparatus may include using any suitable means of indicating the size of the exclusion zone to radio equipment within the zone. In one arrangement, the apparatus comprises beacon circuitry configured to transmit a local beacon signal the strength of which indicates the local size of the part of the exclusion zone, and wherein the exclusion zone circuitry is configured to adjust the strength of the local beacon signal in order to vary the local size of the part of the exclusion zone. In another arrangement, the apparatus comprises map circuitry configured to indicate the local size of the exclusion zone on a map which is accessible by mobile communications apparatus. In yet another arrangement, the apparatus comprises coordinate circuitry configured to indicate the local size of the exclusion zone by transmitting coordinates indicating a boundary of the exclusion zone.

The apparatus may include using any suitable means of obtaining the level of interference. In one arrangement, the exclusion zone circuitry is configured to calculate a difference between a measured level of interference and a maximum acceptable level of interference, and to vary the local size of the part of the exclusion zone in dependence on the difference. In another arrangement, the exclusion zone circuitry is configured to vary the local size of the exclusion zone in dependence only on a measured level of interference (i.e. without reference to a maximum acceptable level of interference). The apparatus may include measurement circuitry configured to measure the level of interference. The maximum acceptable level of interference may be obtained in any suitable way. For example, the apparatus may include memory circuitry configured to store a predefined maximum acceptable level of interference. The predefined maximum acceptable level of interference may be obtained in a measurement campaign before operation of the first wireless communications system. In another arrangement, the apparatus includes calculation circuitry configured to calculate a current maximum acceptable level of interference.

The apparatus may comprise communications circuitry configured to transmit a request for a variation of the local size of the part of the exclusion zone to external circuitry. The communications circuitry may be configured to transmit a request for an increase or a decrease in the size of the exclusion zone.

The apparatus may comprise communications circuitry configured to transmit to external circuitry a signal which is indicative of the level of interference inflicted on the first wireless communications system. The external circuitry may be an exclusion zone controller or the second wireless communications system. The communications circuitry may be configured to transmit the signal in response to a request, received from the external circuitry, for an indication of the level of interference. In another arrangement, the communications circuitry is configured to transmit the signal periodically. In yet another arrangement, the communications circuitry is configured to transmit the signal in response to a change in a measured level of interference.

The apparatus may be configured to determine a desired local size of the part of the exclusion zone (particularly in the case that the exclusion zone controller forms part of the apparatus) and/or to receive a signal which is indicative of a desired local size of the part of the exclusion zone from external circuitry. For example, the apparatus may comprise communications circuitry configured to receive (e.g. from the exclusion zone controller) a signal which is indicative of a desired local size of the part of the exclusion zone, and wherein the exclusion zone circuitry is configured to vary the local size of the exclusion zone to match the desired local size. In another arrangement, the communications circuitry is configured to receive a signal which is indicative of a desired change in the local size of the exclusion zone, and the exclusion zone circuitry is configured to vary the local size of the exclusion zone in accordance with the desired change. In yet another arrangement, the communications circuitry is configured to receive a signal which is indicative of a desired strength of the local beacon signal, and the exclusion zone circuitry is configured to vary the strength of the local beacon signal to match the desired strength. In still another arrangement, the communications circuitry is configured to receive a signal which is indicative of a desired change in the strength of the local beacon signal, and the exclusion zone circuitry is configured to vary the strength of the local beacon signal in accordance with the desired change.

In the case that the exclusion zone controller forms part of the apparatus, the apparatus may be configured to adjust the local size of the part of the exclusion zone appropriately in response to the level of interference. In one arrangement, the exclusion zone circuitry is configured to increase the local size of the exclusion zone in response to an increase in the level of interference and to decrease the local size of the exclusion zone in response to a decrease in the level of interference.

The apparatus may include any suitable means of determining an appropriate local size of the exclusion zone based on the level of interference. In one arrangement, the apparatus comprises memory circuitry configured to store a predefined mapping table of the level of interference against the local size of the part of the exclusion zone, wherein the exclusion zone circuitry is configured to use the mapping table to vary the local size of the exclusion zone in dependence on the level of interference. In another arrangement, the memory circuitry is configured to store a predefined mapping table of the level of interference against the strength of a local beacon signal, wherein the exclusion zone circuitry is configured to use the mapping table to vary the strength of the local beacon signal in accordance with the level of interference. In yet another arrangement, the exclusion zone circuitry is configured to calculate the local size of the exclusion zone in dependence on the level of interference using an algorithm.

The exclusion zone circuitry may be configured to vary the size of the exclusion zone non-uniformly around the perimeter of the exclusion zone. Additionally or alternatively, the exclusion zone circuitry may be configured to move one or more portions of the perimeter of the exclusion zone towards or away from a central region of the exclusion zone. The exclusion zone circuitry may be configured to move the said one or more portions independently of other portions of the perimeter.

The exclusion zone circuitry may be configured to vary the local size dynamically.

The apparatus may include measurement circuitry configured to confirm or otherwise an estimated level of interference inflicted on the first wireless communications system by the second wireless communications system, in response to a request for such confirmation received from the second wireless communications system.

In a fifth aspect, there is provided a controller for use with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the controller comprising communications circuitry configured to receive a signal which is indicative of a level of interference inflicted on the first wireless communications system;

control circuitry configured to determine, in dependence on the level of interference, a desired local size of a part of the exclusion zone;

wherein the communications circuitry is configured to transmit to the first wireless communications system a signal which is indicative of the desired local size of the part of the exclusion zone.

The control circuitry may be configured to increase the desired local size of the part of the exclusion zone in response to an increase in the level of interference and to decrease the desired local size of the part of the exclusion zone in response to a decrease in the level of interference.

The controller may comprise memory circuitry configured to store a predefined mapping table of the level of interference against the desired local size of the part of the exclusion zone, wherein the control circuitry is configured to use the mapping table to determine the desired local size of the part of the exclusion zone.

In one arrangement, the control circuitry is configured to determine a desired strength of a local beacon signal. In this arrangement, the communications circuitry is configured to transmit a signal which is indicative of the desired strength of the local beacon signal. In another arrangement, the communications circuitry is configured to transmit a signal which is indicative of a location of a boundary of the exclusion zone on a map. In another arrangement, the communications circuitry is configured to transmit a signal which is indicative of coordinates of a boundary of the exclusion zone.

In one arrangement, the communications circuitry is configured to receive a signal which is indicative of a measured level of interference inflicted on the first wireless communications system. The control circuitry may be configured to calculate a difference between the measured level of interference and a maximum acceptable level of interference. In another arrangement, the communications circuitry is configured to receive a signal which is indicative of a calculated difference between a measured level of interference and a maximum acceptable level of interference. In either of these arrangements, the control circuitry may be configured to determine the desired local size of the exclusion zone in dependence on the calculated difference. In another arrangement, the control circuitry is configured to determine the desired local size of the exclusion zone in dependence only on a measured level of interference (i.e. without reference to a maximum acceptable level of interference).

In one arrangement, the apparatus comprises memory circuitry configured to store a predefined maximum acceptable level of interference obtained in a measurement campaign before operation of the first wireless communications system. In another arrangement, the control circuitry is configured to calculate a current maximum acceptable level of interference.

The apparatus may include memory circuitry configured to store a predefined mapping table of the level of interference against the strength of a local beacon signal, wherein the control circuitry is configured to use the mapping table to determine a desired strength of the local beacon signal in dependence on the level of interference.

The control circuitry may be configured to request the signal which is indicative of the level of interference inflicted on the first wireless communications system to be transmitted to the controller. The signal which is indicative of the level of interference inflicted on the first wireless communications system may be received from one or both of the first and second wireless communications systems, or from another source. The control circuitry may be configured periodically to send the request.

In one arrangement, the control circuitry is configured to request the signal from the first wireless communications system. The signal may be requested in response to a request for a change in the local size of the exclusion zone from the first wireless communications system. Additionally or alternatively, the control circuitry may be configured to request the signal from the second wireless communications system.

In one arrangement, the control circuitry is configured to request the second wireless communications system to provide an estimation of the interference it is inflicting on the first wireless communications system. The estimation may be requested in response to a request for a change in the size of the exclusion zone received from the second wireless communications system. In another arrangement, the communications circuitry is configured to receive an estimated level of interference which the second wireless communications system is inflicting on the first wireless communications system, e.g. without the estimation having been requested. In either of these arrangements, the control circuitry may be configured to determine the desired local size of the part of the exclusion zone in dependence on the estimated level of interference.

The communications circuitry may be configured to receive an estimation from the second wireless communications system of the level of interference inflicted on the first wireless communications system by the second wireless communications system, wherein the estimation has been confirmed by the first wireless communications system, and wherein the control circuitry is configured to determine the desired local size of the part of the exclusion zone in dependence on the confirmed estimation of the level of interference.

In one arrangement, the control circuitry may be configured to calculate a difference between the level of interference inflicted on the first wireless communications system by the second wireless communications system and a maximum acceptable level of interference on the first wireless communications system. The apparatus may include memory circuitry configured to store the maximum acceptable level of interference. The control circuitry may be configured to calculate the current maximum acceptable level of interference.

In a sixth aspect, there is provided apparatus for interacting with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the apparatus comprising communications circuitry configured to transmit a request for a variation of the local size of a part of the exclusion zone.

The apparatus may form part of the second wireless communications system or a third wireless communications system.

The communications circuitry may be configured to transmit the request to an exclusion zone controller, or to the first wireless communications system, or both.

The communications circuitry may be configured to request a reduction in the size of the exclusion zone.

The apparatus may include estimation circuitry configured to estimate, in the second wireless communications system, the interference which the second wireless communications system is inflicting on the first wireless communications system. The estimation may be carried out in response to a request for the estimation from the exclusion zone controller. The communications circuitry may be configured to send the estimation from the second wireless communications system to the first wireless communications system, optionally with a request for confirmation, and/or to the exclusion zone controller. The communications circuitry may be configured further to receive the confirmation from the first wireless communications system and to send the confirmation to the exclusion zone controller. Additionally or alternatively, the communications circuitry may be configured to send an estimation to the exclusion zone controller without confirmation.

In any of the aspects, the variations in the size of the exclusion zone may be variations made locally to the size of the exclusion zone. In other words, the variations may be made non-uniformly around the perimeter of the exclusion zone. In one arrangement, varying the local size of the part of the exclusion zone may comprise effecting local variations in the size of the exclusion zone. This may comprise varying the size of the exclusion zone non-uniformly around the perimeter of the exclusion zone. Additionally or alternatively, it may comprise moving one or more portions of the perimeter of the exclusion zone towards or away from a central region of the exclusion zone independently of other portions of the perimeter.

The efficiency of local decisions made by a ST Spectrum Assignment entity highly depends on the interference experienced locally by network elements of a network protected by an exclusion zone and the local size of the exclusion zone. Overall changes, say for example expansion of the exclusion zone on all borders, might not always have positive impact on all the ongoing short term spectrum assignments. While one network element might require expansion of the exclusion zone, another might require shrinking on a temporary basis. Effecting local variations in the size of the exclusion zone may provide for fast and localised exclusion zone adjustments in coordination with short term spectrum assignment where the size of exclusion zone might be adapted locally in the short term and in coordination with the ST spectrum assignments.

Intelligent exclusion zone adjustments on a fast and localised basis may provide means to assist Short Term and Long Term Spectrum Assignments and Spectrum Co-existence and Sharing among multiple systems. Local adjustments may avoid the need for further Long Term Spectrum Assignment by providing high efficiency for the Short Term Spectrum Assignment process reducing the cost required for signaling to a LT Spectrum Assignment process. When a system is heavily loaded (i.e. high interference) in some parts and lightly loaded in other parts the method may include performing a localised adjustment of the exclusion zone, which may lead to a fine tuning for an overall slower exclusion zone size control process. Reducing the local size of the exclusion zone may make it possible for secondary systems to exploit higher transmission powers in the shared spectrum band leading to better QoS in the secondary system. The local adjustments may provide for more flexible use of spectrums, fine tuning to ST and LT Spectrum Assignment, improved overall network coverage and throughput, and improved sub-channel use and interference levels.

A local exclusion zone controller may be provided for the localised exclusion zone adjustments, in addition to a main exclusion zone controller. Within certain periods of time (say after every couple of fast localised adjustments) the local and fast exclusion zone controller may inform the main (i.e. central) exclusion zone controller about its decisions. The main exclusion zone controller may take into account the latest size adjustments in the calculation of a new effective and overall size (e.g. radius) of the exclusion zone before making a further decision.

Any aspect may include performing multiple and possibly simultaneous local variations. Communications between the exclusion zone controller and base stations may be fast and direct, avoiding the gateway. The exclusion zone controller may store a set of base stations in a particular network which are most likely to be affected by spectrum assignments involving other networks. The exclusion zone controller may signal the latest size of the exclusion zone to the gateways and all higher layer network entities including that in change of Spectrum Co-existence and Sharing.

In a seventh aspect, there is provided a computer program which, when run on a computer, causes the computer to perform the method of any of the first to third aspects.

In an eighth aspect, there is provided a computer program which, when loaded into a computer, causes the computer to become the apparatus of any of the third to sixth aspects.

In a ninth aspect, there is provided a computer program of any of the seventh to eighth aspects, carried by a carrier medium.

The carrier medium may be a recording medium, or a transmission medium.

In a tenth aspect, there is provided a computer program which, when run on a computer, causes the computer to perform a method of reducing interference in a first wireless communications system, the first wireless communications system being operable in use to take part in a spectrum assignment process involving at least a second wireless communications system, the method comprising defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process; and varying the local size of part of the exclusion zone in dependence on a level of interference inflicted on the first wireless communications system.

In an eleventh aspect, there is provided a computer program which, when run on a computer, causes the computer to perform a method of operating a controller for use with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the method comprising
    receiving a signal which is indicative of a level of interference inflicted on the first wireless communications system;
    determining, in dependence on the level of interference, a desired local size of a part of the exclusion zone;
    transmitting to the first wireless communications system a signal which is indicative of the desired local size of the part of the exclusion zone.

In a twelfth aspect, there is provided which, when run on a computer, causes the computer to perform a method of interacting with a first wireless communications system, the first wireless communications system being operable in use to take part in a spectrum assignment process involving at least a second wireless communications system, the first wireless communications system defining an exclusion zone in proximity to the first wireless communications system, the exclusion zone indicating that any mobile communications apparatus located within the exclusion zone is not permitted to communicate with the second wireless communications system using a portion of spectrum which was pre-assigned to the first wireless communications system and which is currently re-assigned to the second wireless communications system as part of the spectrum assignment process, the method comprising transmitting a request for a variation of the size of the exclusion zone.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

FIGS. 4 to 18 relate to arrangements in which variations are made to the overall size of an exclusion zone.

Figure 1:
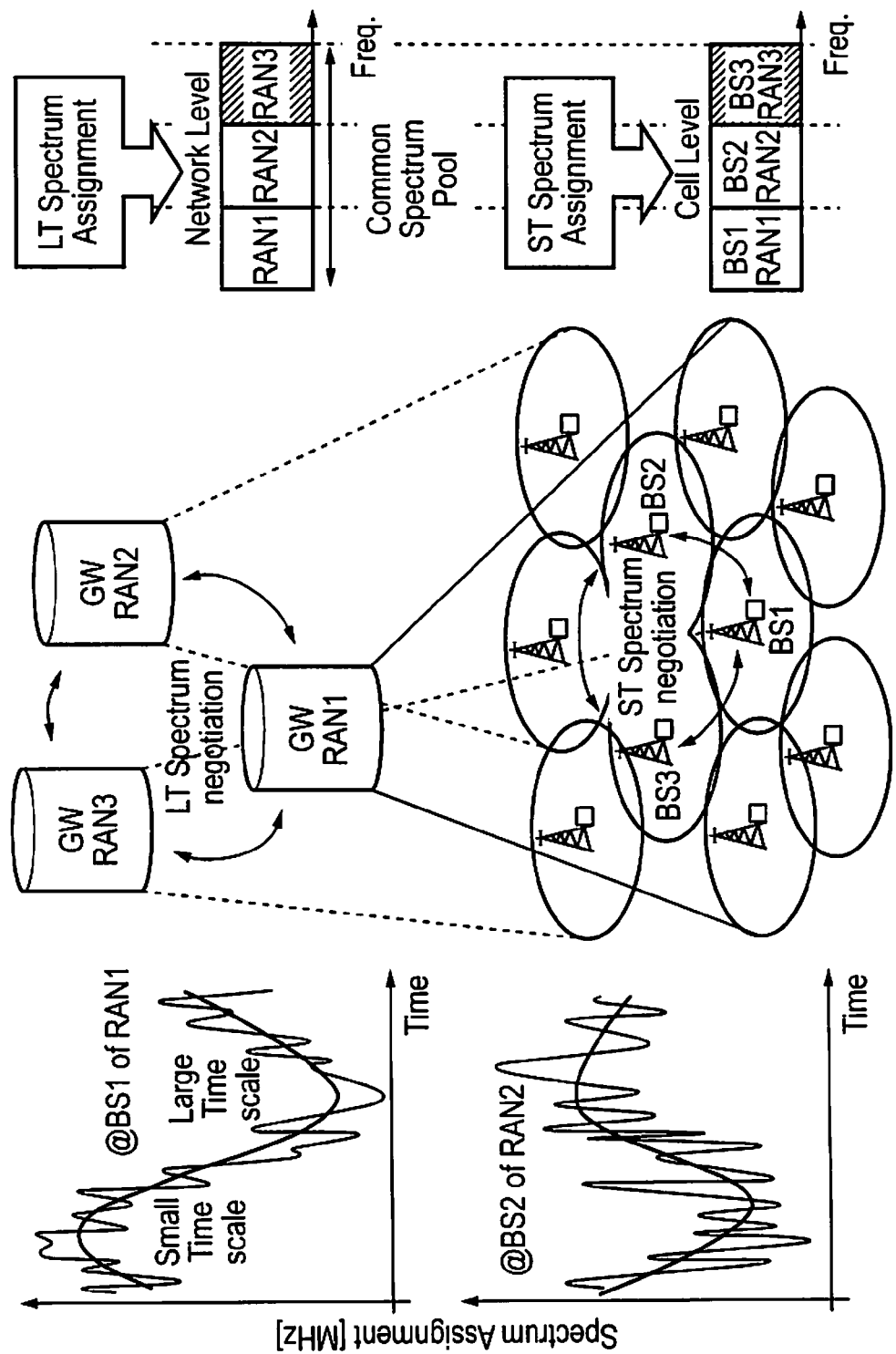
FIG. 1 shows a simplified architecture proposed for a spectrum assignment scenario.
Figure 2:
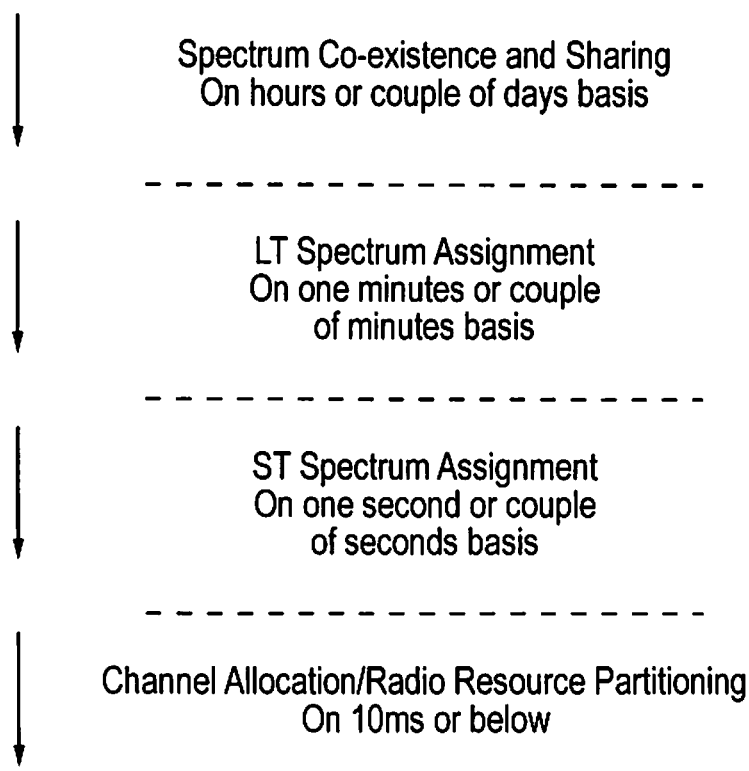
FIG. 2 shows a hierarchical structure illustrating an employed time granularity.
Figure 3:
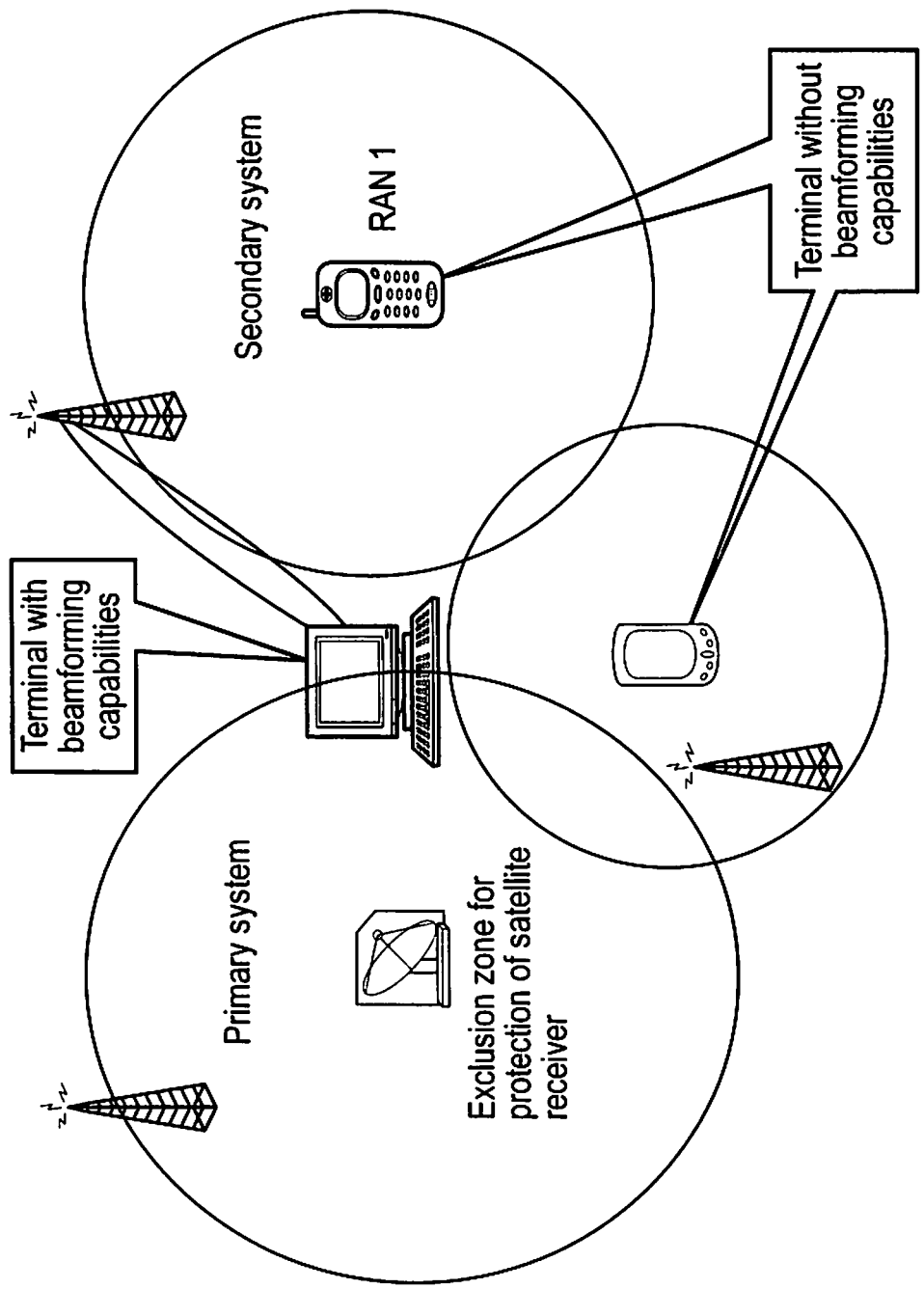
FIG. 3 illustrates the concept of an exclusion zone.
Figure 4:
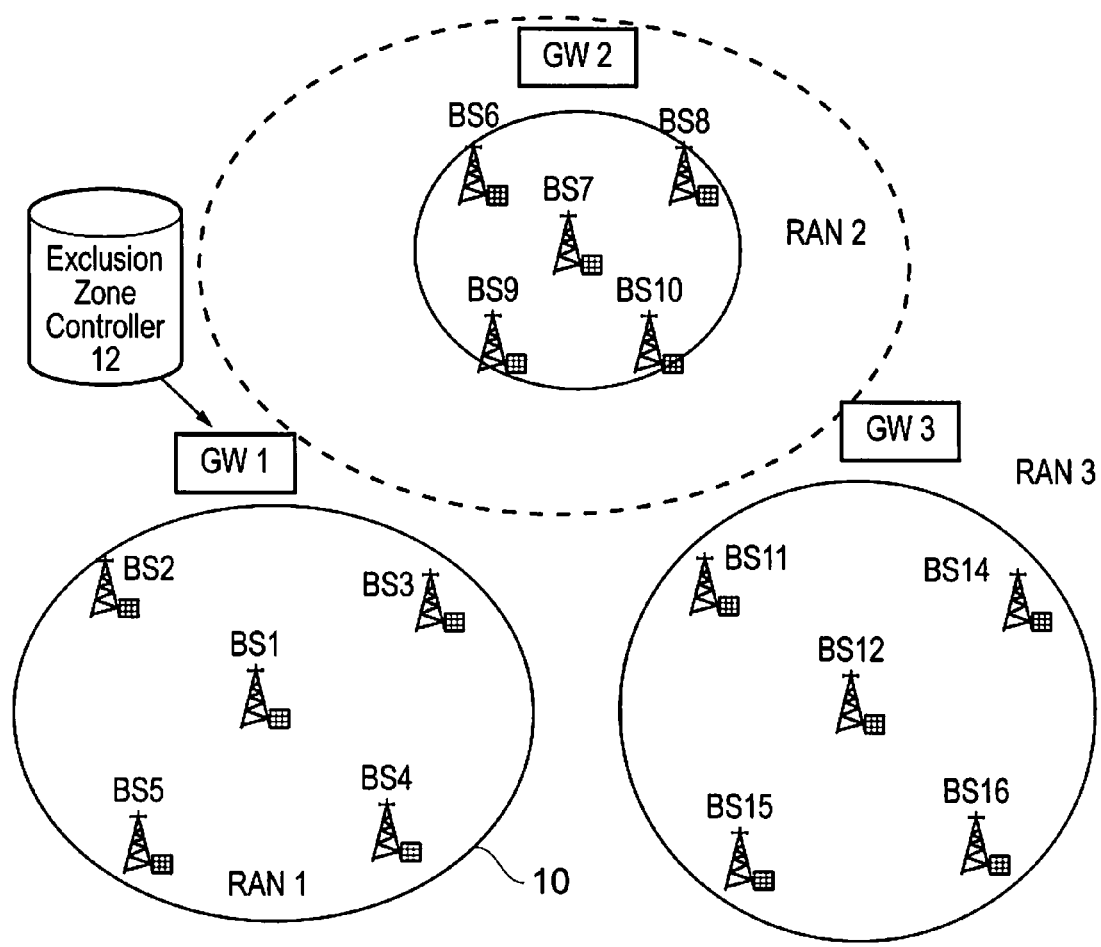
FIG. 4 illustrates an exclusion zone controller requesting a gateway of a first radio access network for interference evaluations.

FIG. 4 illustrates a spectrum sharing scenario which includes first, second and third wireless communication systems, which in this case are radio access networks RAN1-3, and external circuitry, which in this case is an exclusion zone controller 12. The radio access networks RAN1-3 are operable in use to take part in a spectrum assignment process. The first radio access network RAN1 consists of first to fifth network elements, which in this case are base stations BS1-5, and a gateway GW1. The first radio access network RAN1 defines an exclusion zone 10 surrounding itself. The second radio access network RAN2 consists of sixth to tenth base stations BS6-10 and a gateway GW2. The third radio access network RAN3 consists of eleventh to sixteenth base stations BS11-16 and a gateway GW3. The exclusion zone controller 12 is located within communication range of the networks RAN1-3 and operates to determine the size of the exclusion zone 10, interacting with the networks RAN1-3 in a manner that will be described.

The exclusion zone 10 indicates to any mobile communications apparatus located within the exclusion zone 10, for example user equipment, that is not permitted to communicate with either the second radio access network RAN2 or the third radio access network RAN3 using a portion of spectrum which was pre-assigned to the first radio access network RAN1 and which is currently, as part of the spectrum assignment process, re-assigned to either the second radio access network RAN2 or the third radio access network RAN3.

The first radio access network RAN1 defines the exclusion zone 10 by transmitting a beacon signal from its gateway GW1. The strength of the beacon signal indicates the size of the exclusion zone 10. User equipment (not shown) located within range of the gateway GW1 periodically listens to the beacon signal. If the beacon signal strength is above a specified threshold for that user equipment, the user equipment determines that it is within the exclusion zone 10 and stops any spectrum sharing or operation in the spectrum assigned to the gateway GW1.

A first arrangement will be described with reference to FIGS. 4-7, 14A and 16.

In this arrangement, the exclusion zone controller 12 is configured to send periodic requests to the first radio access network RAN1. In step S1 of FIG. 16, the exclusion zone controller 12 sends such a request.

In step S2, the gateway GW1 estimates the current maximum acceptable level of interference θ inflicted on the base stations BS1-5 of the first radio access network RAN1 (i.e. interference on their corresponding cells). In one version, the maximum acceptable level of interference θ is the sum of the safe interference levels that may be experienced by each cell and is recorded before operation of the first radio access network RAN1 as a result of a measurement campaign. In another version, each cell (i.e. the cell of the respective base station BS1-5) sends its current maximum acceptable level of interference $\theta_n$ to the gateway GW1. The gateway GW1 then adds all the received values to determine the estimated θ value.

In step S3, the gateway GW1 asks its assigned base stations BS1-5 to measure their own real interference measurements and reports of the total interference inflicted on their respective cells (or an indication of total interference in each cell) to the gateway GW1.

In step S4, the base stations BS1-5 provide this information to the gateway GW1.

Figure 5:
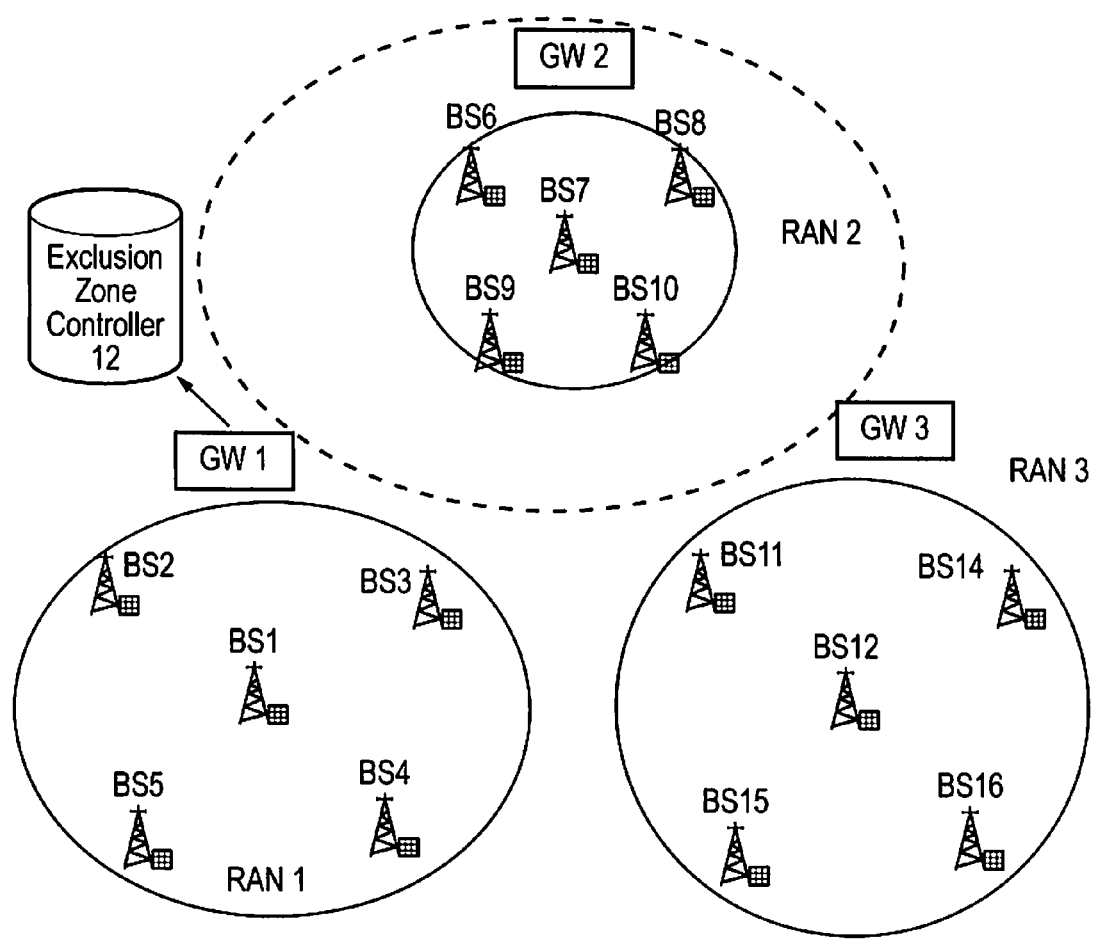
FIG. 5 illustrates the gateway sending the interference evaluations to the exclusion zone controller.

In step S5, the gateway GW1 computes the difference between the maximum acceptable level of interference (as determined in step S2) and the sum of all the interferences measured and reported by the base stations BS1-5 (in step S3). The gateway GW1 signals this difference to the exclusion zone controller 12, as shown in FIG. 5.

In step S6, the exclusion zone controller 12 determines a desired size of the exclusion zone 10 in dependence on the difference as determined in step S5. The exclusion zone controller 12 stores a predefined mapping table of the difference (which is representative of the level of interference inflicted on the first radio access network RAN1) against the desired size of the exclusion zone 10, and uses the mapping table to look up a desired size of the exclusion zone 10 in accordance with the difference. In this case, the desired size of the exclusion zone 10 is represented by a desired power of the beacon signal, and it is the power of the beacon signal which is stored in the mapping table. The power of the beacon signal is proportional to the desired size of the exclusion zone 10 (the larger the desired size of the exclusion zone 10, the higher the power of the beacon signal). The exclusion zone controller 12 signals the desired power of the beacon signal to the gateway GW1 (see FIG. 6) and, thus, the gateway GW1 is able to adjust the power of the beacon signal in order to vary the size of the exclusion zone 10 (i.e. such that the actual beacon signal power matches the desired beacon signal power).

Figure 6:
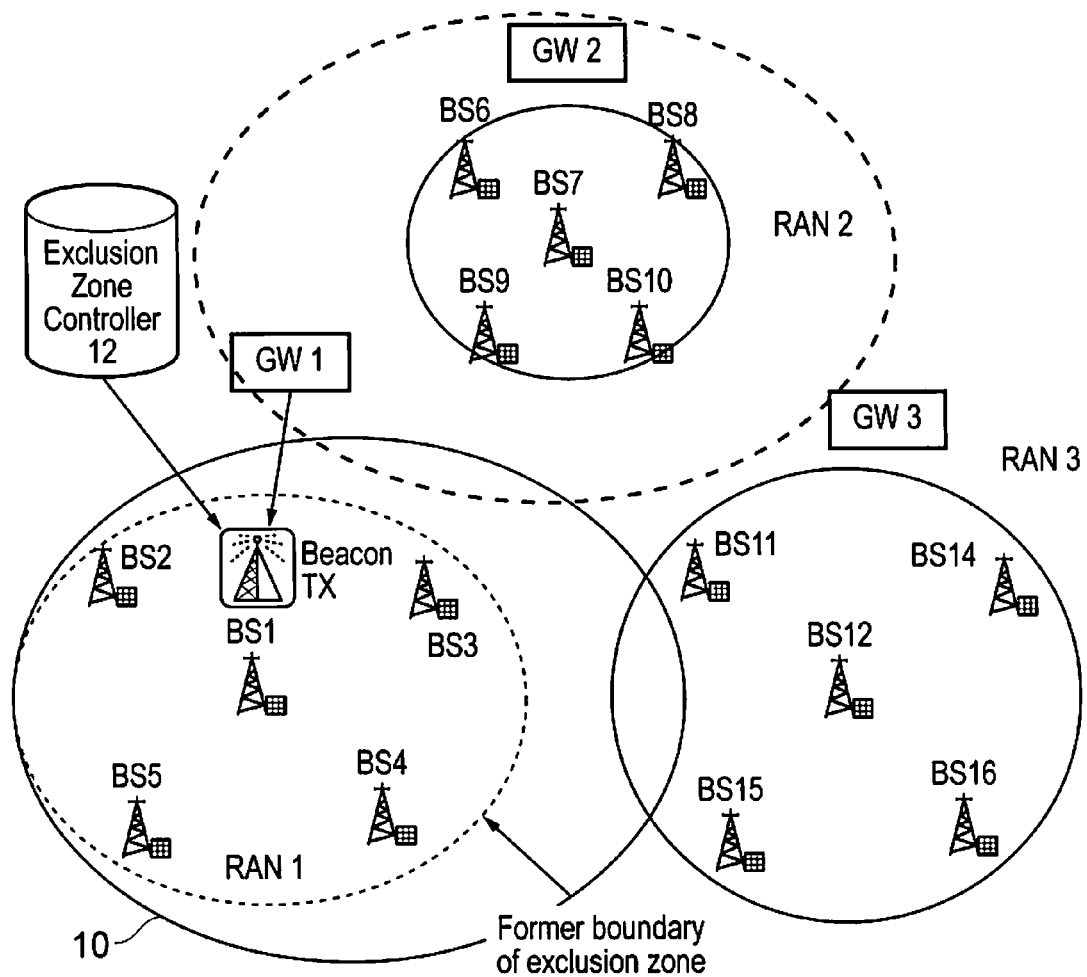
FIG. 6 illustrates the exclusion zone controller increasing the size of the exclusion zone.
Figure 7:
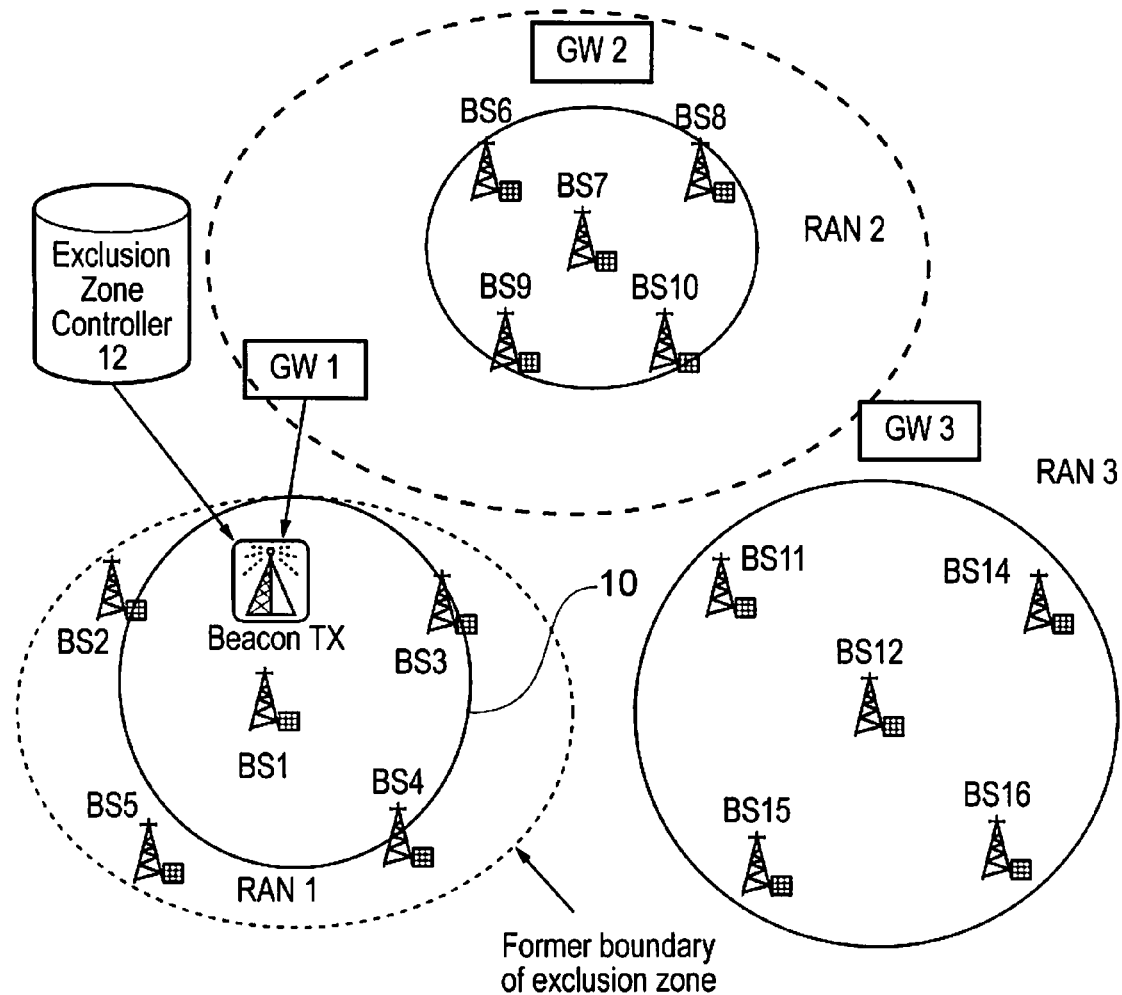
FIG. 7 illustrates the exclusion zone controller reducing the size of the exclusion zone.

If the interference difference is low (i.e. the level of interference is high), it shows that the first radio access network RAN1 is currently being affected by high transmit power from the other radio access networks RAN2-3 involved in the ST and LT Spectrum Assignment and Sharing process. Consequently, in step S7, the exclusion zone controller 12 extends the exclusion zone 10 accordingly, as shown in FIG. 6. If the difference is high (i.e. the level of interference is low), in step S8, the exclusion zone controller 12 may shrink the exclusion zone 10, as shown in FIG. 7.

Figure 14A:
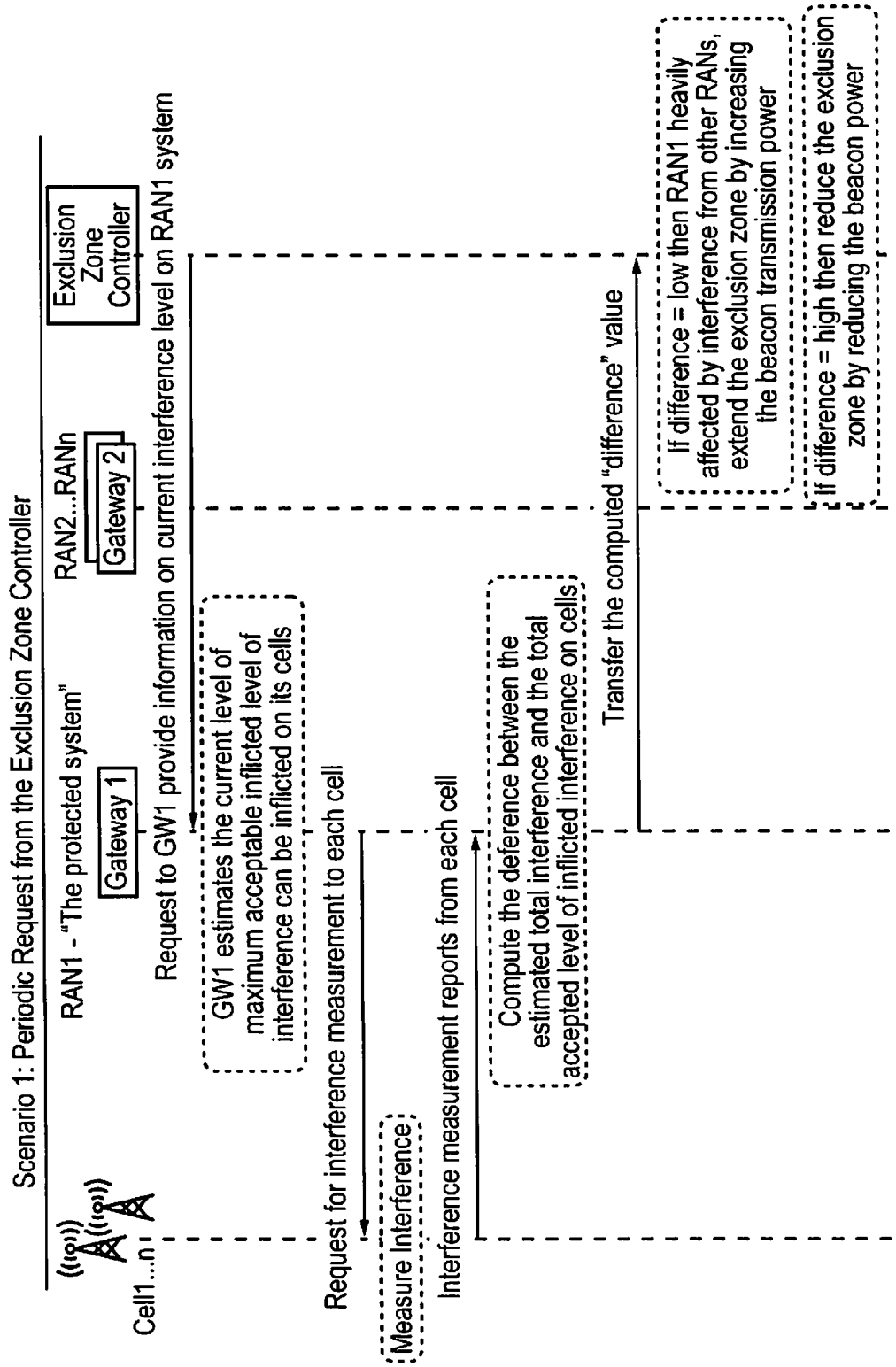
FIGS. 14A, 14B and 14C illustrate signaling which takes place in first, second and third arrangements respectively.

FIG. 14A illustrates the signaling which takes in the first arrangement.

A second arrangement will now be described with reference to FIGS. 8-13, 14B and 17.

In this arrangement, a secondary system, the second radio access network RAN2, requests a change in the size of the exclusion zone 10.

A primary system, the first radio access network RAN1 in this example, is assigned an exclusion zone 10. Two or more other radio access networks RAN2 and RAN3 are sharing spectrum with the first radio access network RAN1.

Due to higher traffic load, RAN2 is in urgent need for spectrum resources, and the need is detected and a request sent to the exclusion zone controller 12 in step S1. To have a better access to the spectrum which was pre-assigned to the first radio access network RAN1 and re-assigned to the second radio access network RAN2 in the spectrum assignment process, it needs to have the exclusion zone 10 reduced.

Figure 8:
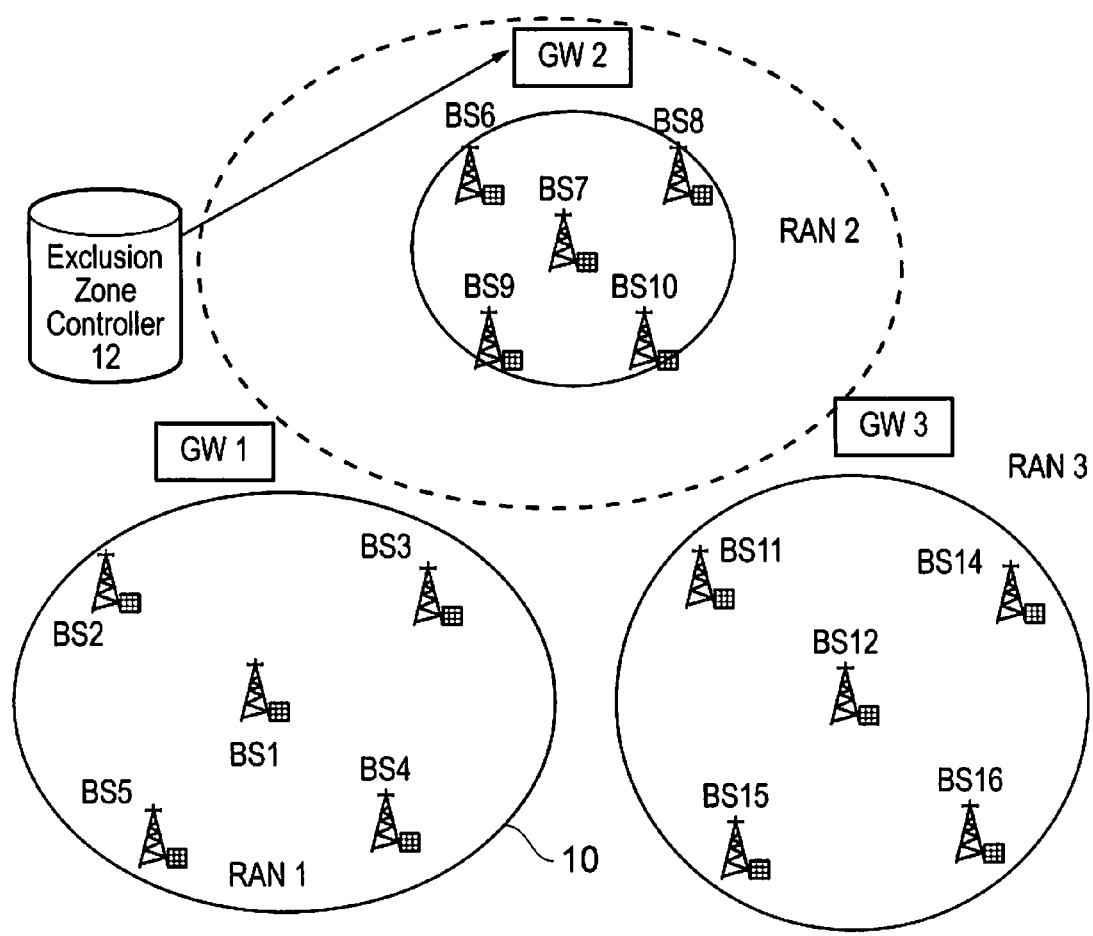
FIG. 8 illustrates the exclusion zone controller requesting interference evaluations from a gateway of a second radio access network.

In step S2, as shown in FIG. 8, the exclusion zone controller 12 asks the gateway GW2 assigned to the second radio access network RAN2 to provide an estimation of the interference it thinks it is inflicting on the first radio access network RAN1.

In step S3, the gateway GW2 estimates the current total level of interference inflicted on the cells of the first radio access network RAN1 based on its current transmission power level and link gains.

Figure 9:
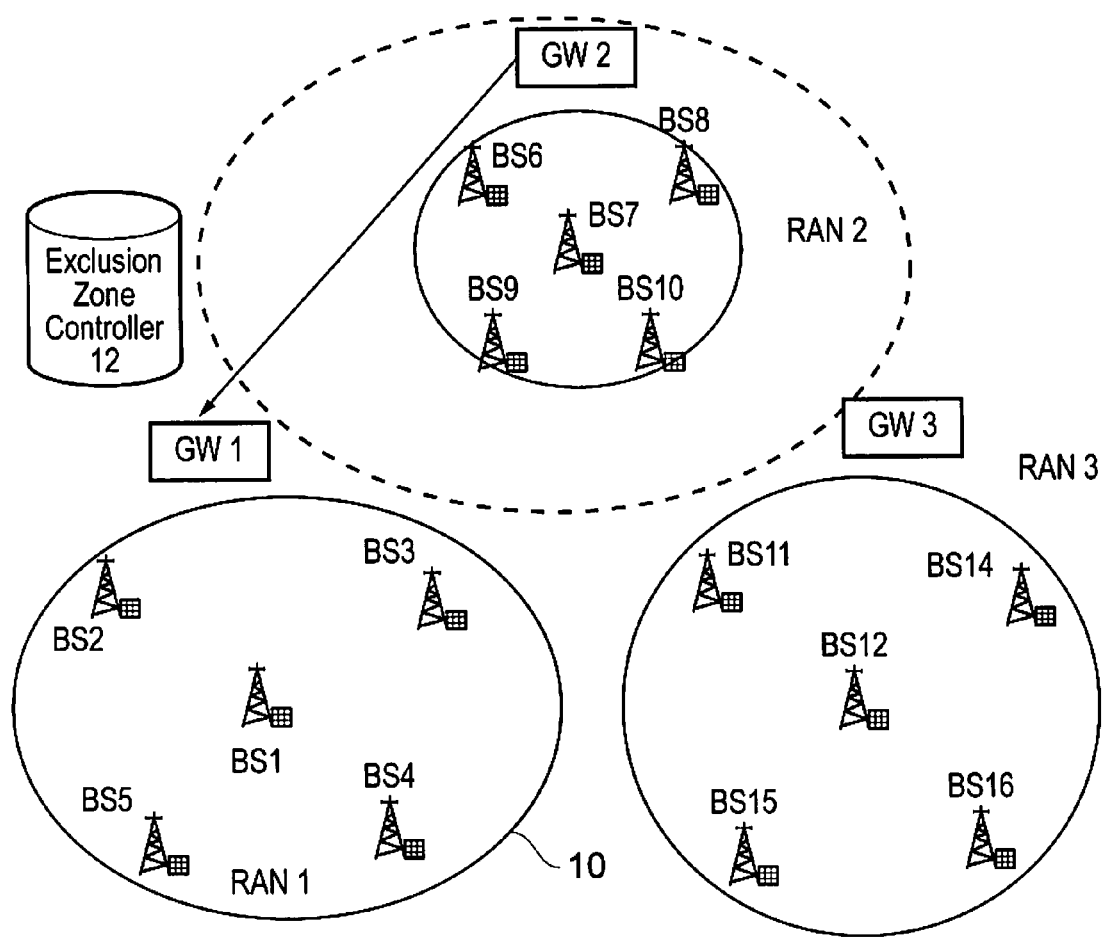
FIG. 9 illustrates the gateway of the second radio access network requesting confirmation of the interference evaluations from the gateway of the first radio access network.

In step S4, the gateway GW2 asks the gateway GW1 to confirm the estimation, as shown in FIG. 9.

Figure 10:
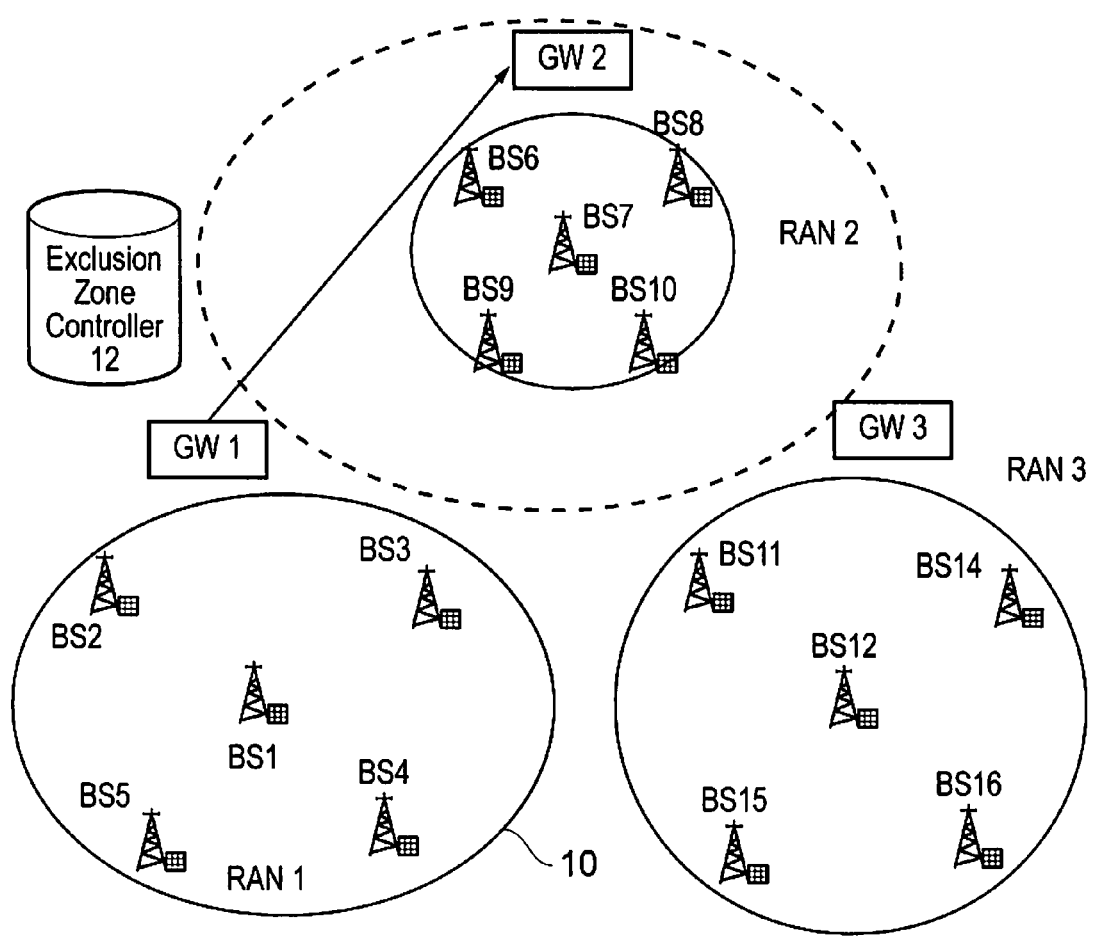
FIG. 10 illustrates the gateway of the first radio access network confirming the interference evaluations.

In step S5, the gateway GW1 confirms the estimated level of interference coming from the direction of the second radio access network RAN2 by signaling to the gateway GW2, as shown in FIG. 10. If the gateway GW1 does not confirm the estimation, the process will be stopped and the exclusion zone controller may decline the request for change.

Figure 11:
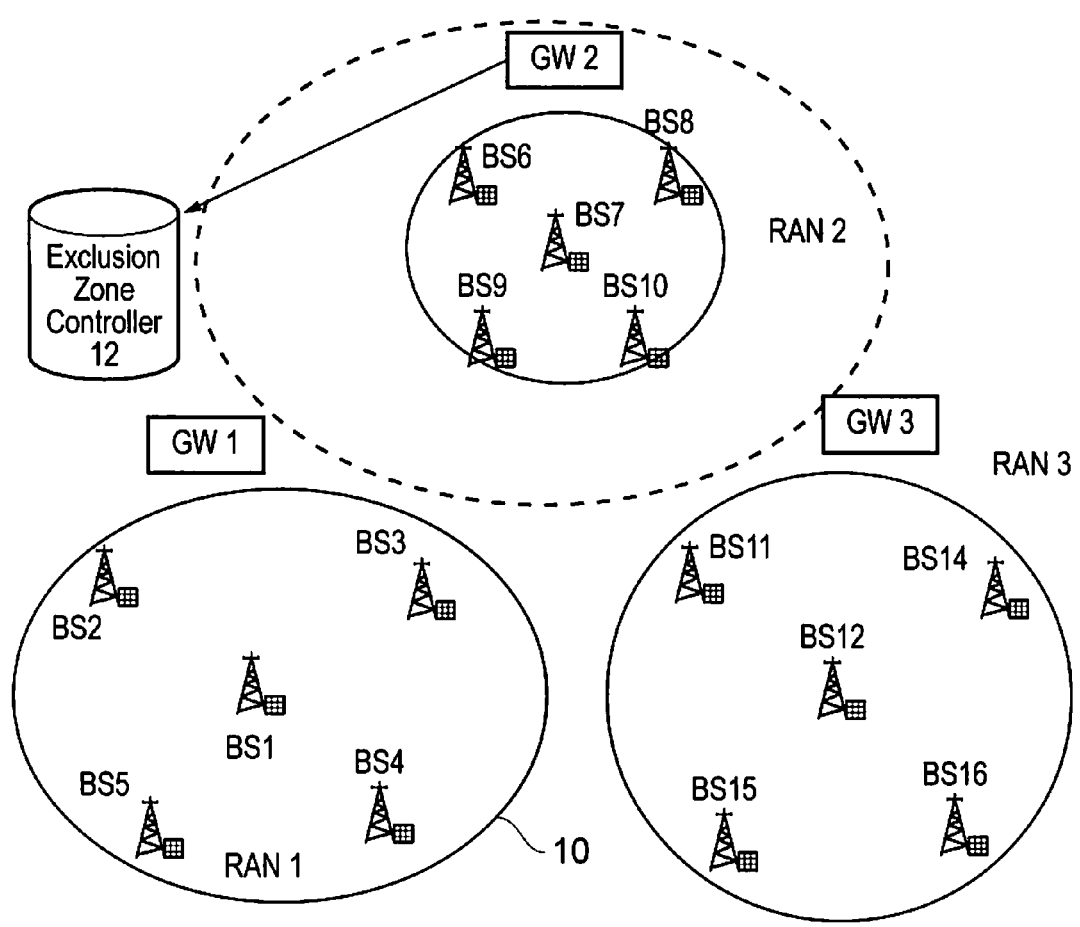
FIG. 11 illustrates the gateway of the second radio access network sending the confirmed interference evaluations to the exclusion zone controller.

In step S6, the gateway GW2 sends the confirmed value to the exclusion zone controller 12, as shown in FIG. 11. The exclusion zone controller 12 already has the knowledge of the maximum acceptable level of interference θ which can be inflicted on the first radio access network RAN1 and determines the difference between the maximum acceptable level of interference θ and the reported value from the gateway GW2.

In step S7, the exclusion zone controller 12 uses a predefined mapping table of the difference as determined in step S6 versus the size (e.g. area) of the exclusion zone 10 (i.e. the transmission power of the beacon signal) to determine the desired size of the exclusion zone 10. The exclusion zone controller 12 signals the desired power of the beacon signal to the gateway GW1 and, thus, the gateway GW1 is able to adjust the power of the beacon signal such that the actual beacon signal power matches the desired beacon signal power.

Figure 12:
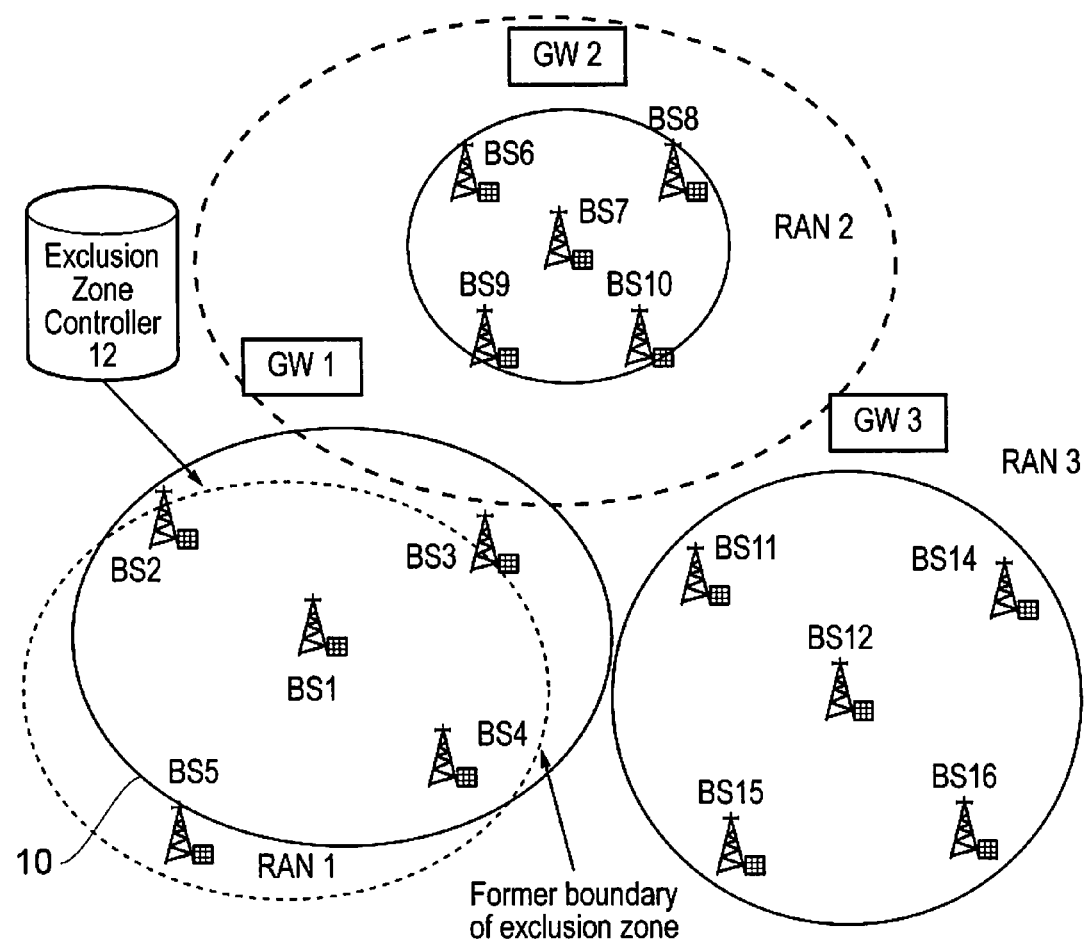
FIG. 12 illustrates the exclusion zone controller increasing the size of the exclusion zone.

If the interference difference is low it shows that the first radio access network RAN1 is currently is being affected by high transmit power from the other radio access networks RAN2-3 involved in the ST and LT Spectrum Assignment and Sharing process. Consequently, in step S8, the exclusion zone controller 12 extends the exclusion zone 10, as shown in FIG. 12, by increasing the beacon signal transmission power.

Figure 13:
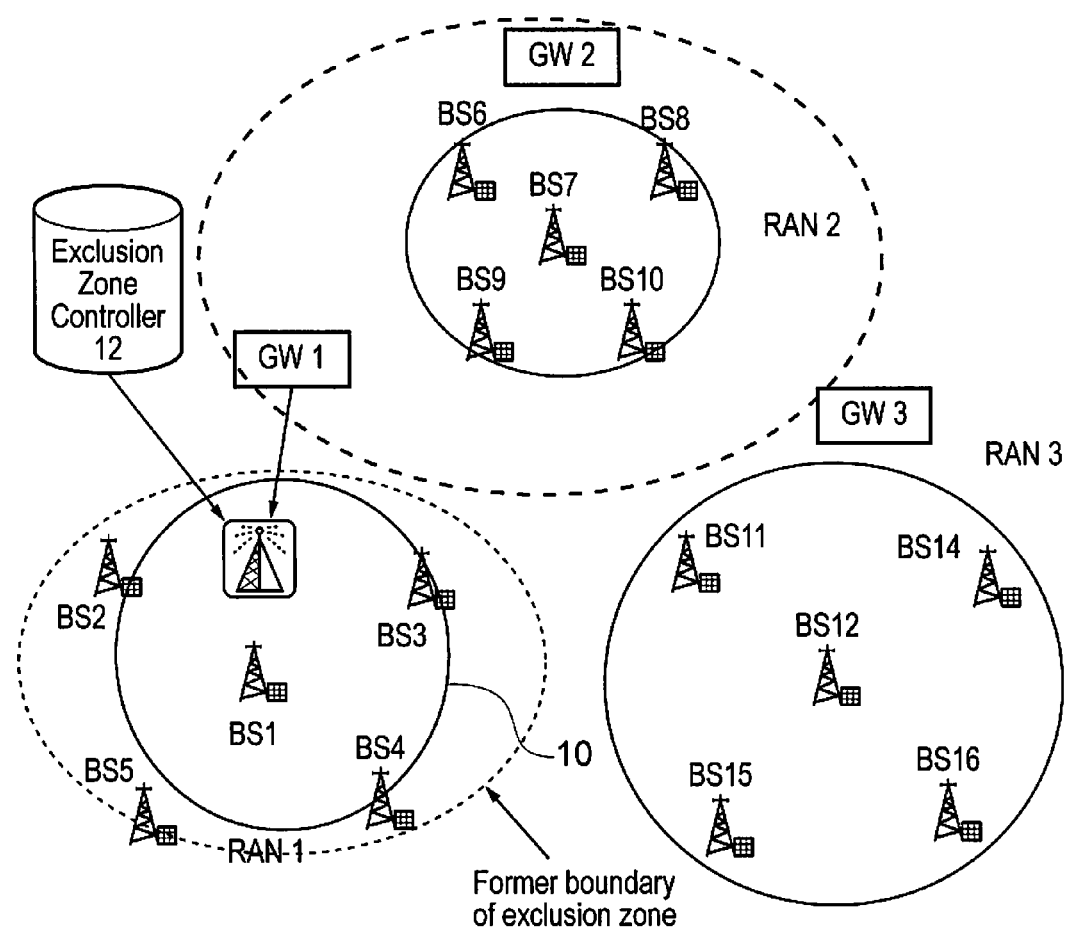
FIG. 13 illustrates the exclusion zone controller reducing the size of the exclusion zone.

In step S9, if the difference is high, the exclusion zone controller 12 may shrink the exclusion zone 10, as shown in FIG. 13, by reducing the beacon signal transmission power.

Figure 14B:
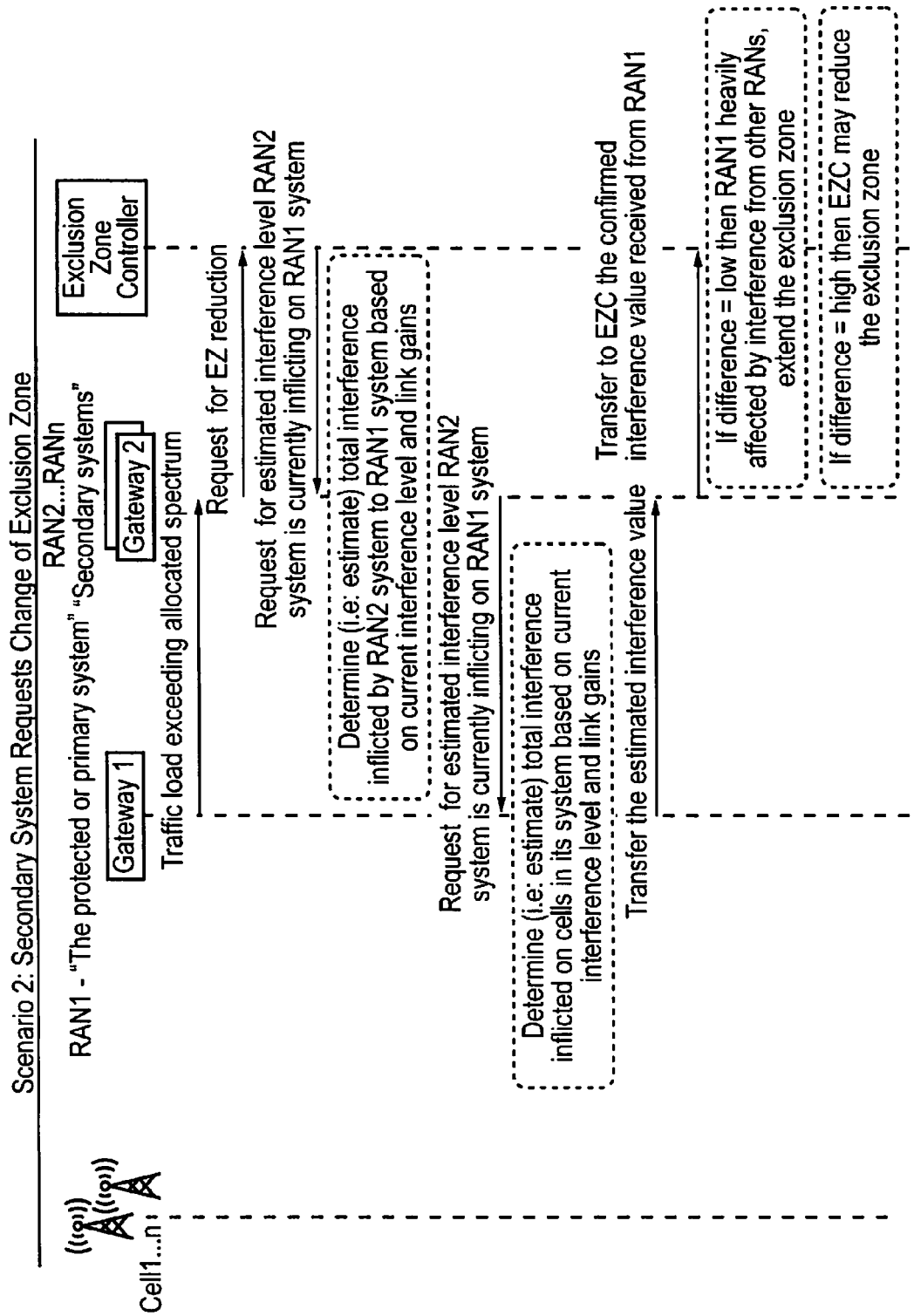

FIG. 14B illustrates the signaling which takes place in the second arrangement.

A third arrangement will now be described with reference to FIGS. 14C, 15 and 18.

Figure 15:
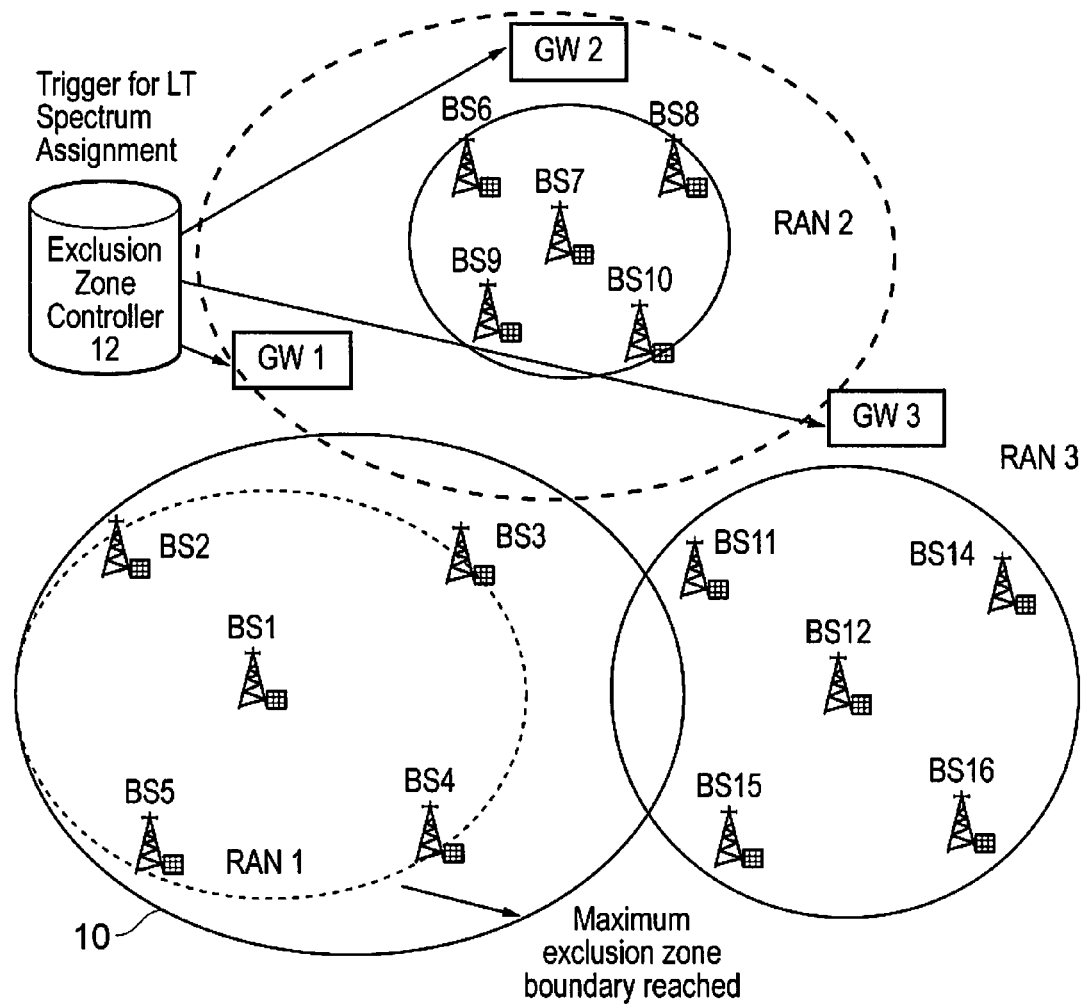
FIG. 15 illustrates the exclusion zone controller triggering LT Spectrum Assignment.
Figure 16:
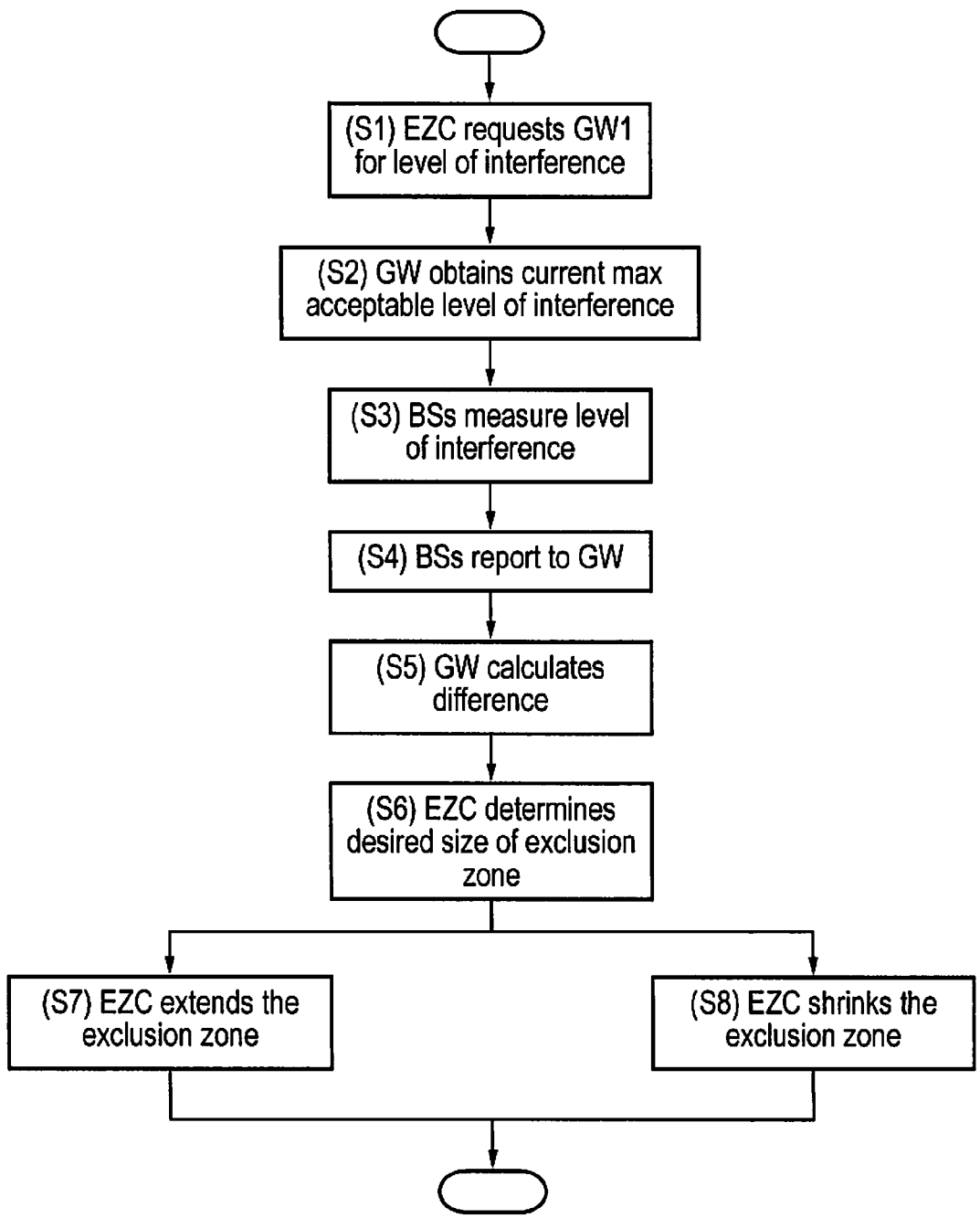
FIG. 16 is a flowchart representing a method of dynamically adjusting the size of the exclusion zone according to the first arrangement.
Figure 17:
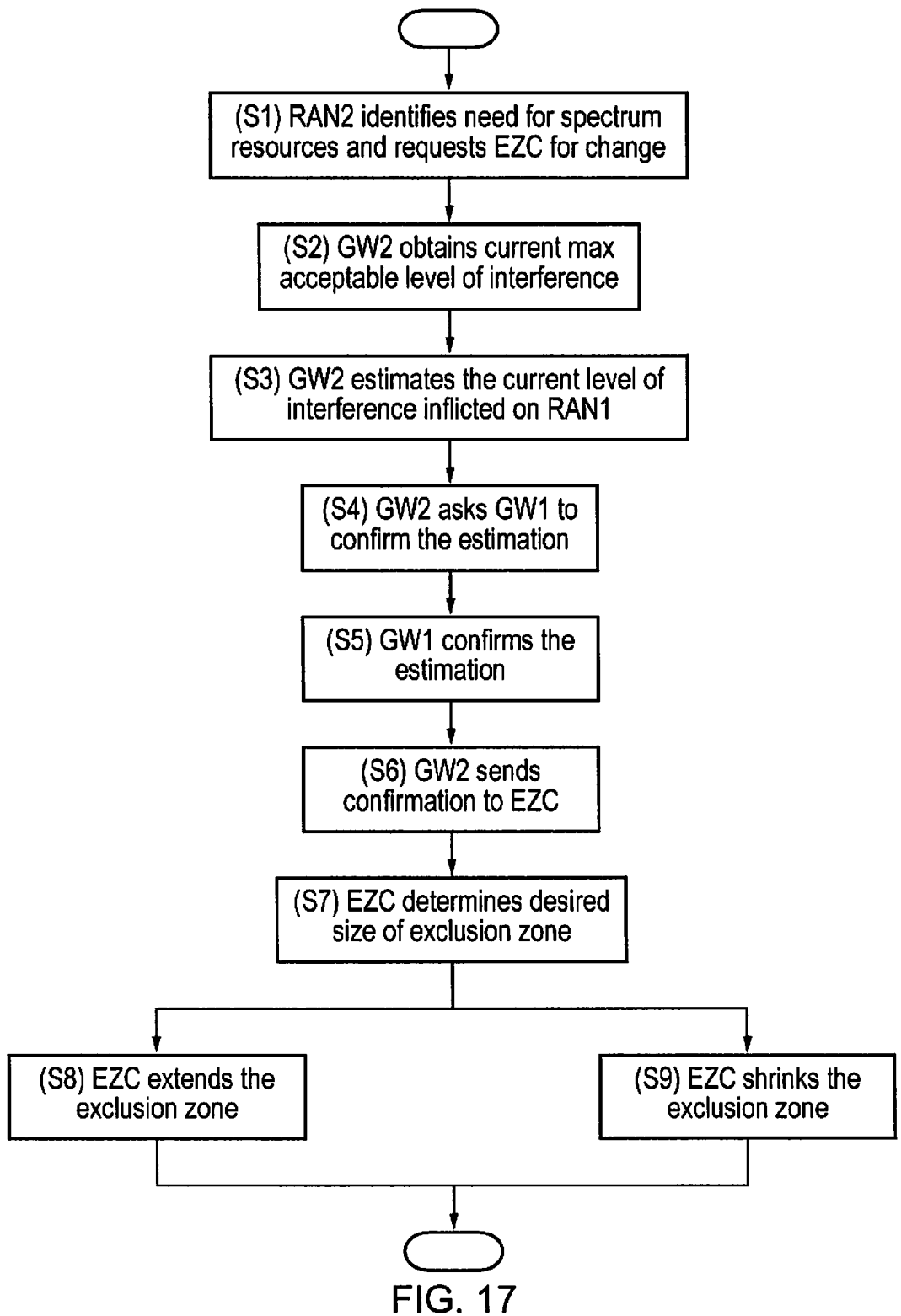
FIG. 17 is a flowchart representing a method of dynamically adjusting the size of the exclusion zone according to the second arrangement.
Figure 18:
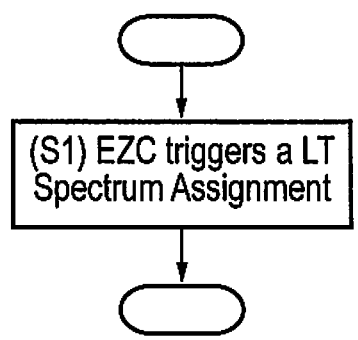
FIG. 18 is a flowchart representing a method of dynamically adjusting the size of the exclusion zone according to the third arrangement.

In either of the first and second arrangements, if the exclusion zone controller 12 reaches a maximum exclusion expansion and there is further need for expanding the exclusion zone 10 (which is currently impossible), in step S1 of FIG. 18, the exclusion zone controller 12 triggers a LT Spectrum Assignment, as shown in FIG. 15.

Figure 14C:
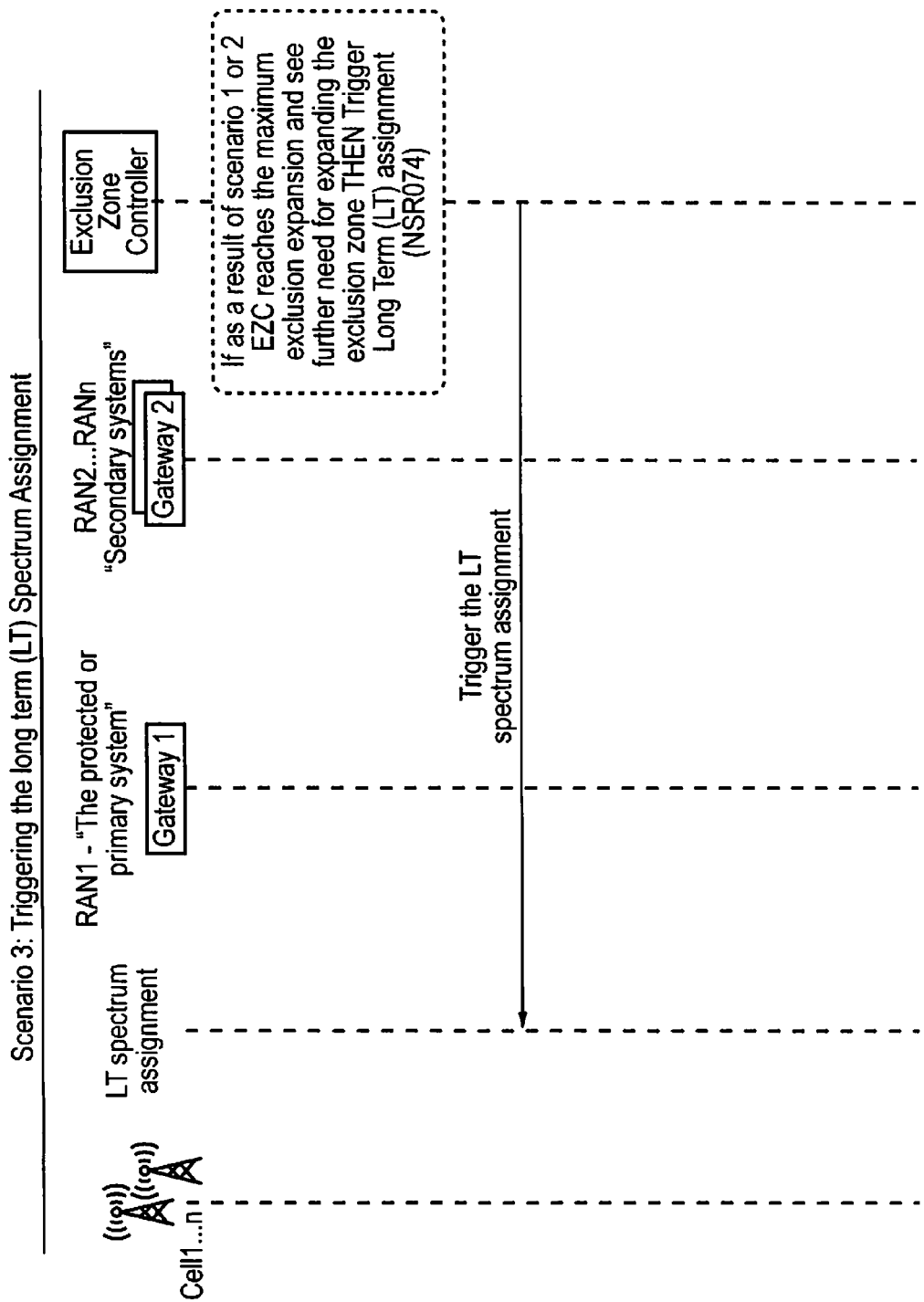

FIG. 14C illustrates the signaling which takes in the third arrangement.

There now follows a brief explanation of interference in a radio network consisting of J transceiver nodes. These transceivers are fixed or they can move. They are distributed uniformly in a square region of dimension L×L. It is assumed that transceivers have the capability to listen to sub-channels and measure the interference received from other transceivers on each radio sub-band. It is assumed that the radio sub-channels are shared between the transceivers and that, if two transceivers choose the same radio sub-channel, it will have some impact on both depending on the radio channel between them.

It is assumed that N transceivers form a cluster of transceivers. It is assumed that overall available spectrum has been divided into P sub channels and each transceiver might transmit at each time in M sub-channels so that M<P.

It is assumed that the interactions between the transceivers can be characterised by the following interference function:

$$\omega(i,j,S_m)=1 \text{ if transceivers } i \text{ and } j \text{ are both transmitting over the } m\text{-th sub-channel } S_m \quad (1)$$

else $\omega(i,j,S_m)=0$

The interference from transceiver i on the BS j at radio sub-channel $S_m$ is assumed to be:

$$I_{ijm}=p_i\eta_{ij}\omega(i,j,S_m) \text{ where } m=1\ldots M \quad (2)$$

where M is the number of radio sub-channels, $p_i$ is the transmission power associated with transceiver i and $\eta_{ij}$ is the overall transmission gain associated with the link from the transceiver i and transceiver j. In a similar way the interference inflicted on transceiver i by transceiver j is expressed as $$I_{jim}=p_j\eta_{ji}\omega(j,i,S_m) \text{ where } m=1\ldots M \quad (3)$$

The overall interference $\gamma_i$ received from all the other transceivers can be determined as $$\gamma_i = \sum_{j=1,j\neq i}^{N} \sum_{m=1}^{M} I_{jim} \quad (4)$$

The overall interference $\beta_i$ inflicted by BS i on the other base stations can be determined as $$\beta_i = \sum_{j=1,j\neq i}^{N} \sum_{m=1}^{M} I_{ijm} \quad (5)$$

The total interference inflicted on all the transceivers within a cluster can be expressed as $$\theta = \sum_{i=1,i\neq j}^{N} \sum_{j=1,i\neq j}^{N} \sum_{m=1}^{M} I_{ijm} \quad (6)$$

We assume that total traffic loads handled a transceiver is:

$$\alpha_i = \sum_{k=1}^{K} d_{ki} \quad (7)$$

where $d_{ki}$ is the amount of data currently residing in the k th buffer of the i th base station.

In contrast to FIGS. 4 to 18, which relate to overall adjustments in the size of the exclusion zone, FIGS. 19 to 36 relate to arrangements in which variations are made to the local size of an exclusion zone.

Figure 19:
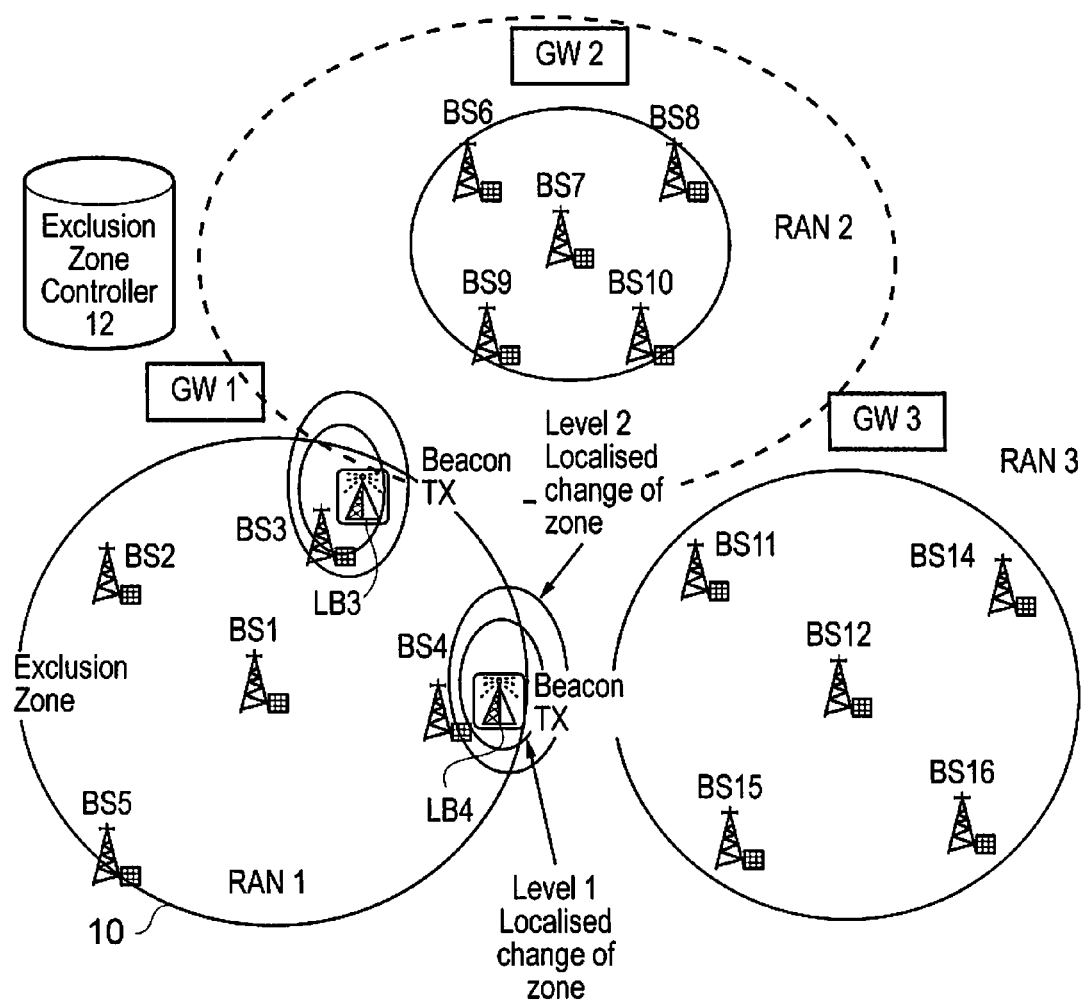
FIG. 19 illustrates a localised variation in the size of an exclusion zone.

Referring to FIG. 19, it is likely that base stations BS3 and BS4 of the first radio access network RAN1 will become engaged in a short term spectrum assignment process.

In order to make local adjustments to the size of exclusion zone 10, a local beacon signal transmitter is assigned to each base station which has the potential to become involved in spectrum negotiations (in this case, local beacon signal transmitters LB3 and LB4 are assigned to base stations BS3 and BS4). Each local beacon signal is updated every time an update of the size of the exclusion zone 10 is necessary. The interference experienced by each base station BS3, BS4 is linked to the power strength of the beacon signal: the larger the level of interference, the larger the local size of the exclusion zone 10 and the stronger the beacon signal power.

Any mobile communications apparatus in approach to the exclusion zone 10 periodically listens to the local beacon signal. If the strength of the beacon signal is above a specified threshold for that mobile communications apparatus, the mobile communications apparatus determines that it is within the exclusion zone 10 and stops any spectrum sharing or operation in the spectrum assigned to the gateway GW1.

With reference to FIGS. 20 to 22 and 33, in the fourth arrangement, a base station in the first radio access network RAN1 sends a request for a local variation in the size of the exclusion zone 10.

Figure 20:
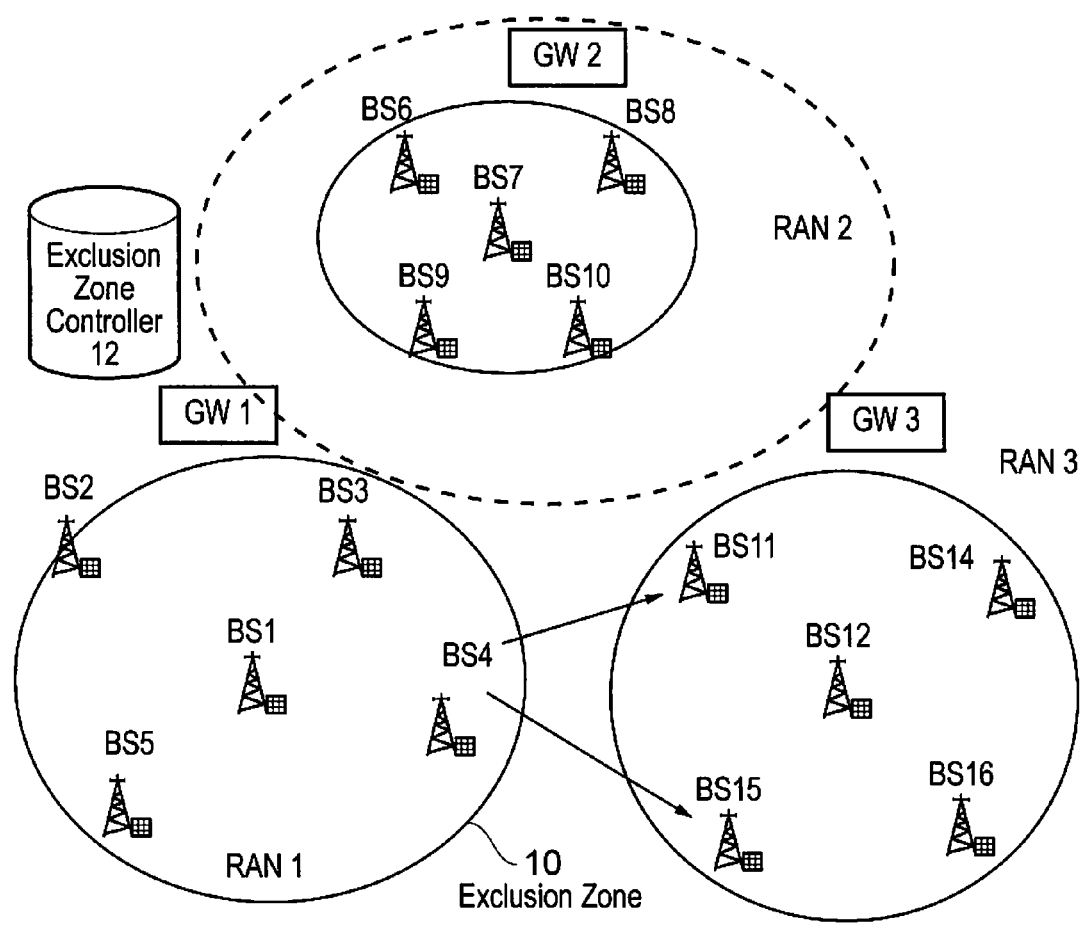
FIG. 20 illustrates localised short term exclusion zone management.

In step S1, base station BS4 in the first radio access network RAN1 gets involved in short term spectrum assignment negotiations with base stations BS11 and BS15 of the third radio access network RAN3, as shown in FIG. 20.

In step S2, after completing the short term assignment process, the base station BS4 realises that the interference level that the base stations BS1 and BS5 receive as a result of Short Term Spectrum Assignment is not significant. (As the base station BS2 is located far away from the negotiation area and from the base station BS4, it is unlikely that it will be affected by the interference coming from the third radio access network RAN3. In order to avoid unnecessary signaling, base stations that are located far away from the negotiation area or the negotiating base station may be ignored.)

Figure 21:
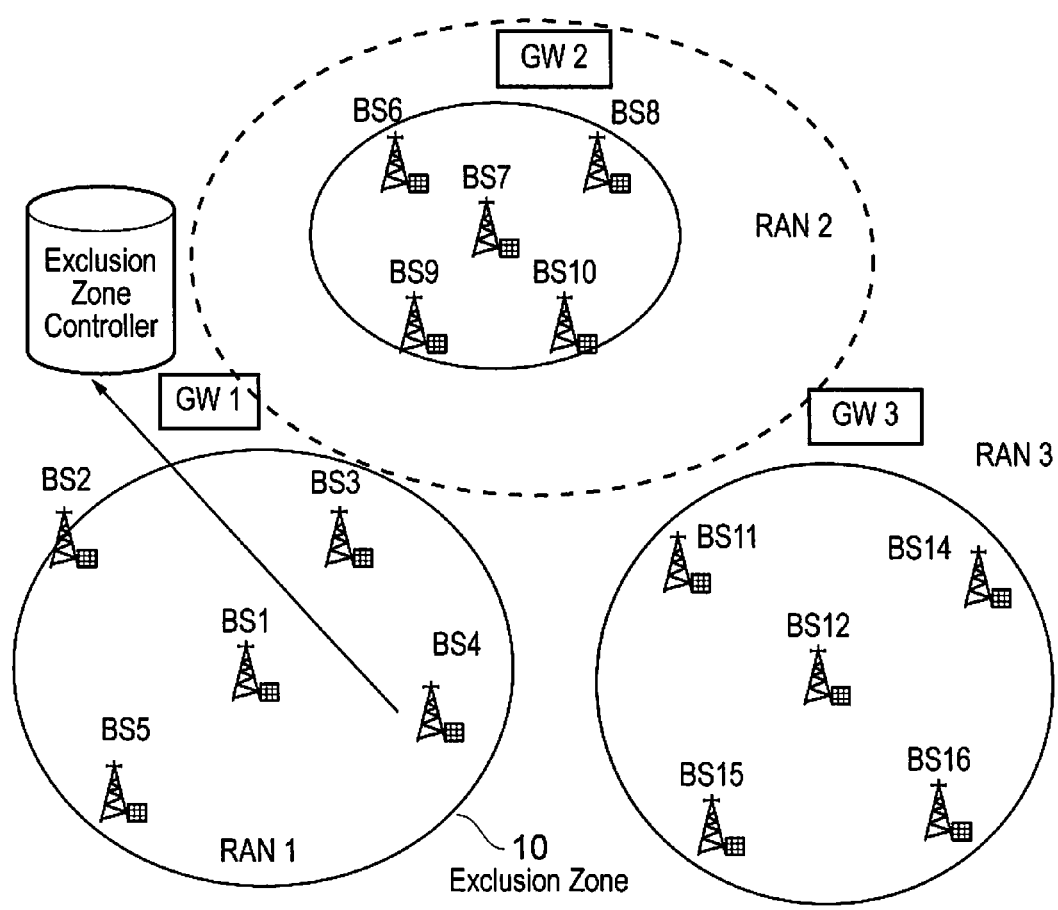
FIG. 21 illustrates localised short term exclusion zone management.

In step S3, the base station BS4 signals its interest for a smaller local size for exclusion zone directly to the exclusion zone controller 12, as shown in FIG. 21, in order to get even better and more short term assignment deals in future from the third radio access network RAN3.

Figure 22:
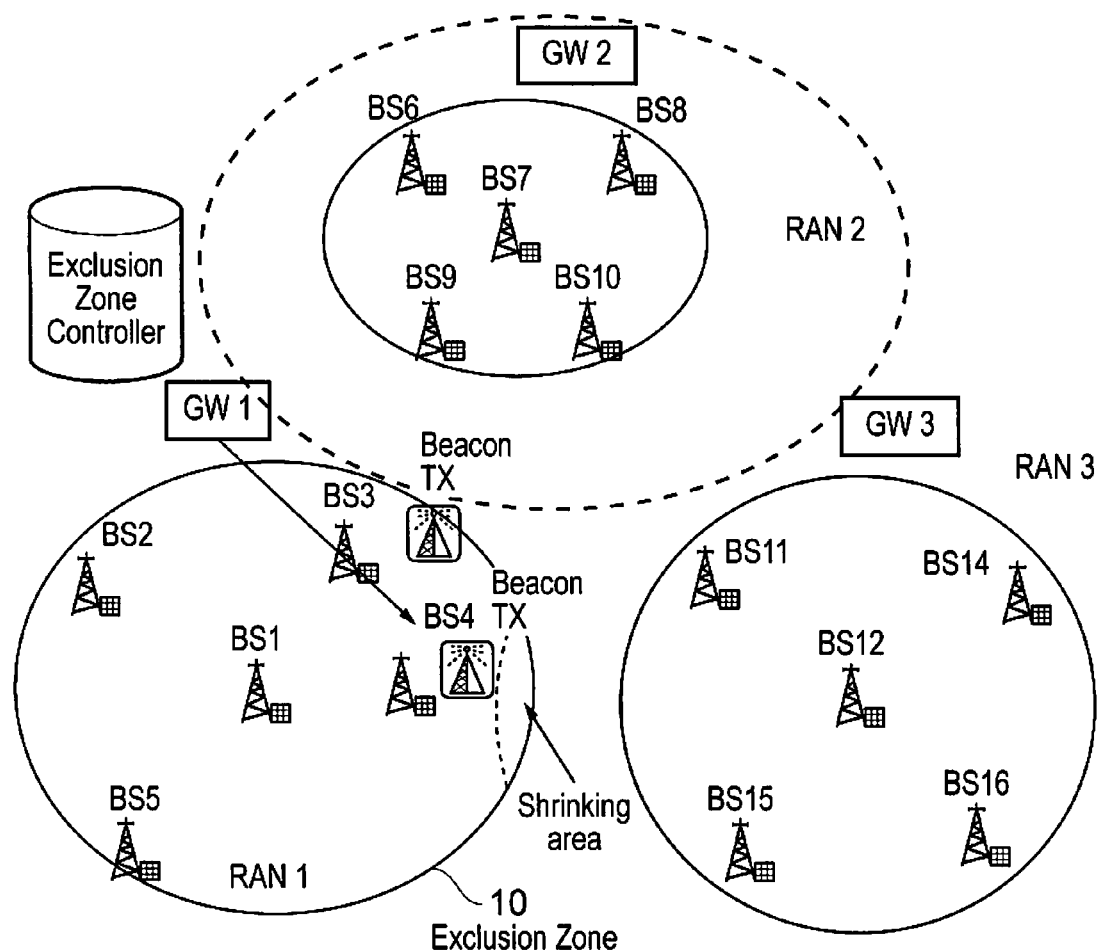
FIG. 22 illustrates shrinking the exclusion zones on a localised basis.

In step S4, the exclusion zone controller 12 maps the interference level to the size of a local variation in the exclusion zone 10 and, if it is less than the current local size, in step S5, it shrinks the exclusion zone 10 (for example by reducing the transmission power of the local beacon signal), as shown in FIG. 22. Otherwise, it increases the size of the local variation in step S6.

With reference to FIGS. 23 to 25 and 34, in the fifth arrangement, a base station in the third radio access network RAN3 sends a request for a local variation in the size of the exclusion zone 10.

Figure 23:
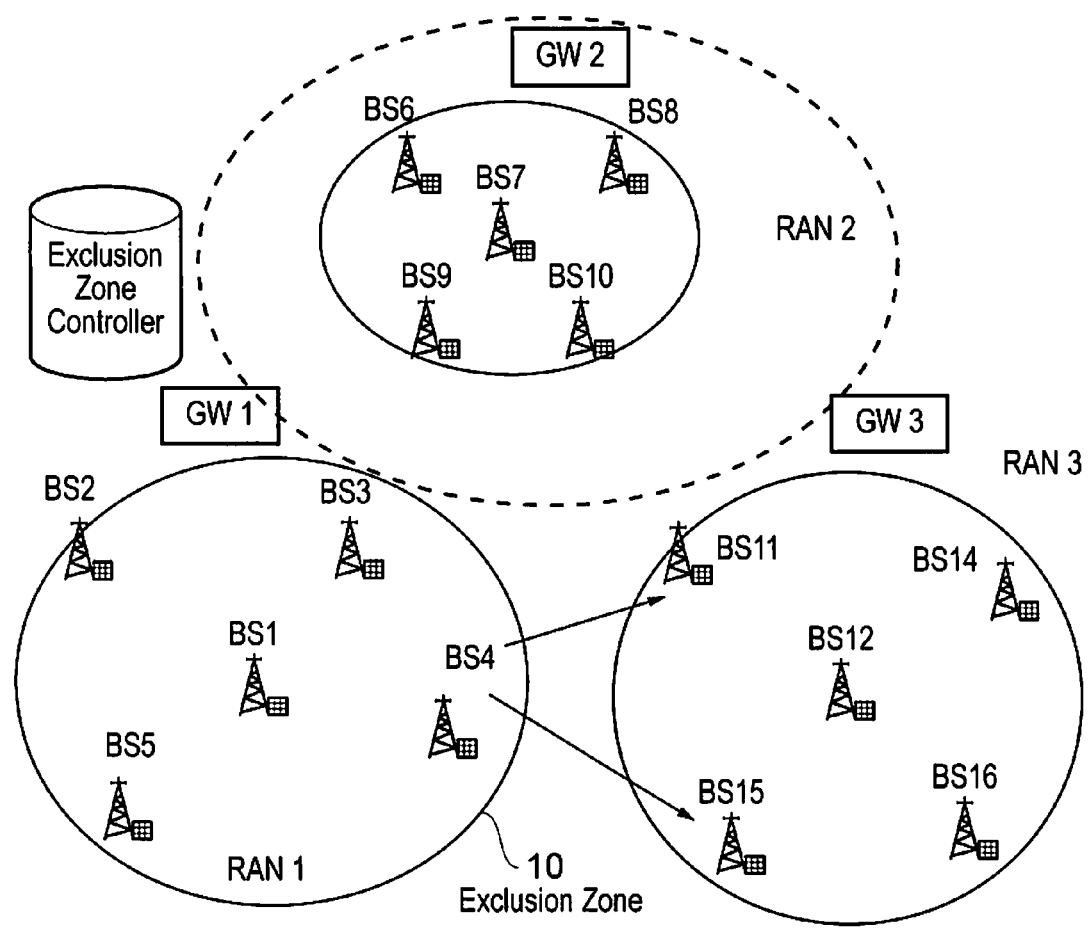
FIG. 23 illustrates localised short term exclusion zone management.

Step S1: in this example, the base station BS4 from the first radio access network RAN1 gets involved in short term spectrum assignment negotiations with the base stations BS11 and BS15 of the third radio access network RAN3, as shown in FIG. 23.

In step S2, after completing the ST Spectrum Assignment process, the base stations BS11 and BS15 experience low SIR.

Figure 24:
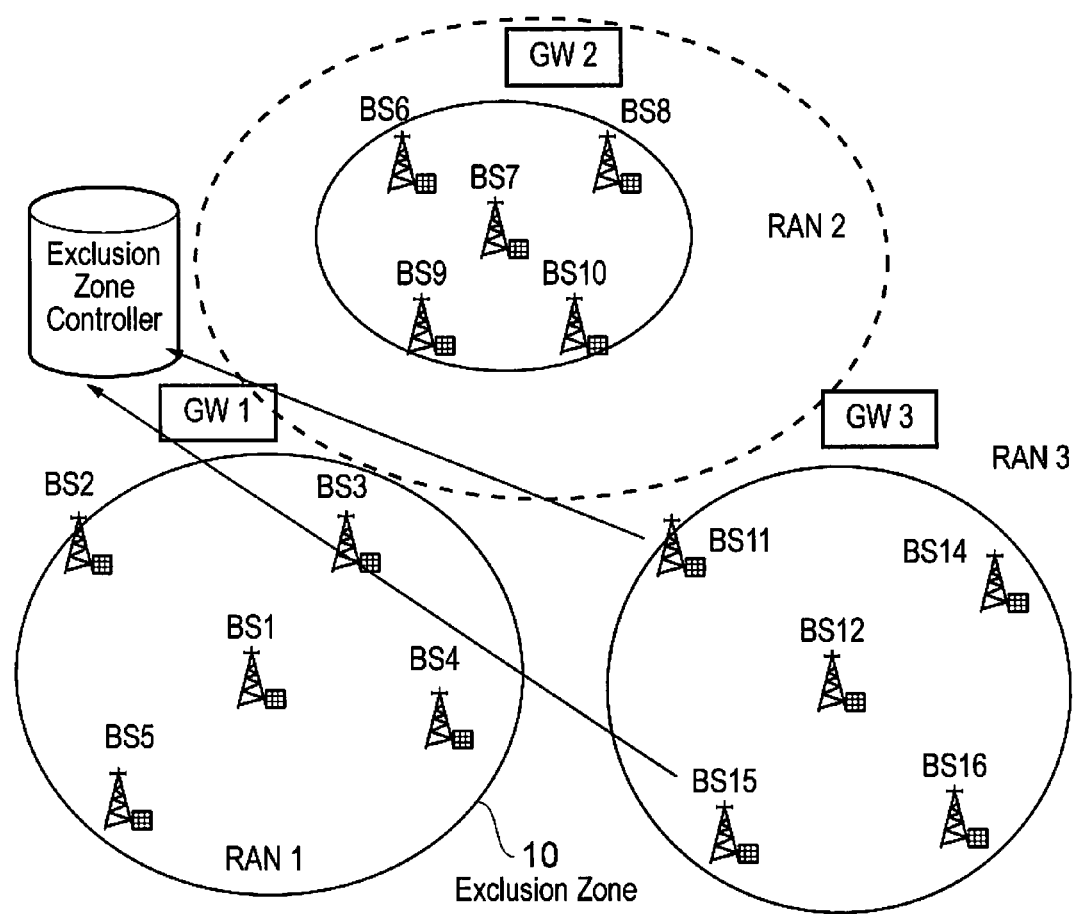
FIG. 24 illustrates base stations BS11 and BS15 sending requests for local shrinking the exclusion zone.

In step S3, the base stations BS11 and BS15 express their unhappiness with the SIR level by sending a request for a local reduction in the size of the exclusion zone 10 to the exclusion zone controller 12, as shown in FIG. 24. A local reduction in the size of the exclusion zone 10 would the base stations BS11 and BS15 to transmit with higher power and get potentially better short term spectrum assignment deals. (Any mobile communications apparatus in the area can perform more spectrum sharing closer to the centre of the first radio access network RAN1.)

Figure 25:
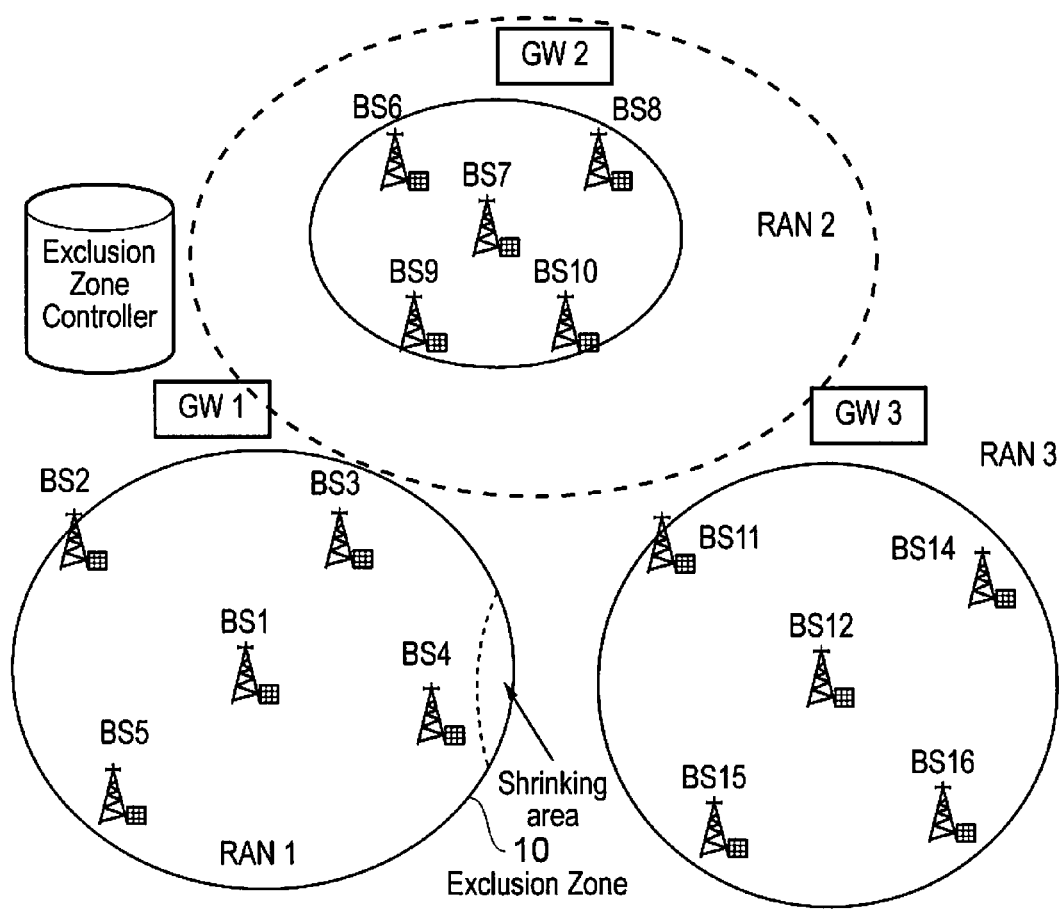
FIG. 25 illustrates shrinking the exclusion zone on a localised basis.

In step S4, the exclusion zone controller 12 asks for the interference level from the base stations that are most likely to be affected by this specific spectrum assignment process (in this case, for example, the base stations BS1 and BS5). The exclusion zone controller 12 then maps the current interference level to a local exclusion zone size. If the said size is below the current local size, in step S5, it shrinks the exclusion zone locally, as shown in FIG. 25 (i.e. by reducing the transmission power of the local beacon signal). Otherwise, in step S6, the exclusion zone controller 12 increases the size of the exclusion zone locally.

With reference to FIGS. 26 to 28 and 35, in the sixth arrangement, periodic monitoring is performed by the exclusion zone controller 12.

Figure 26:
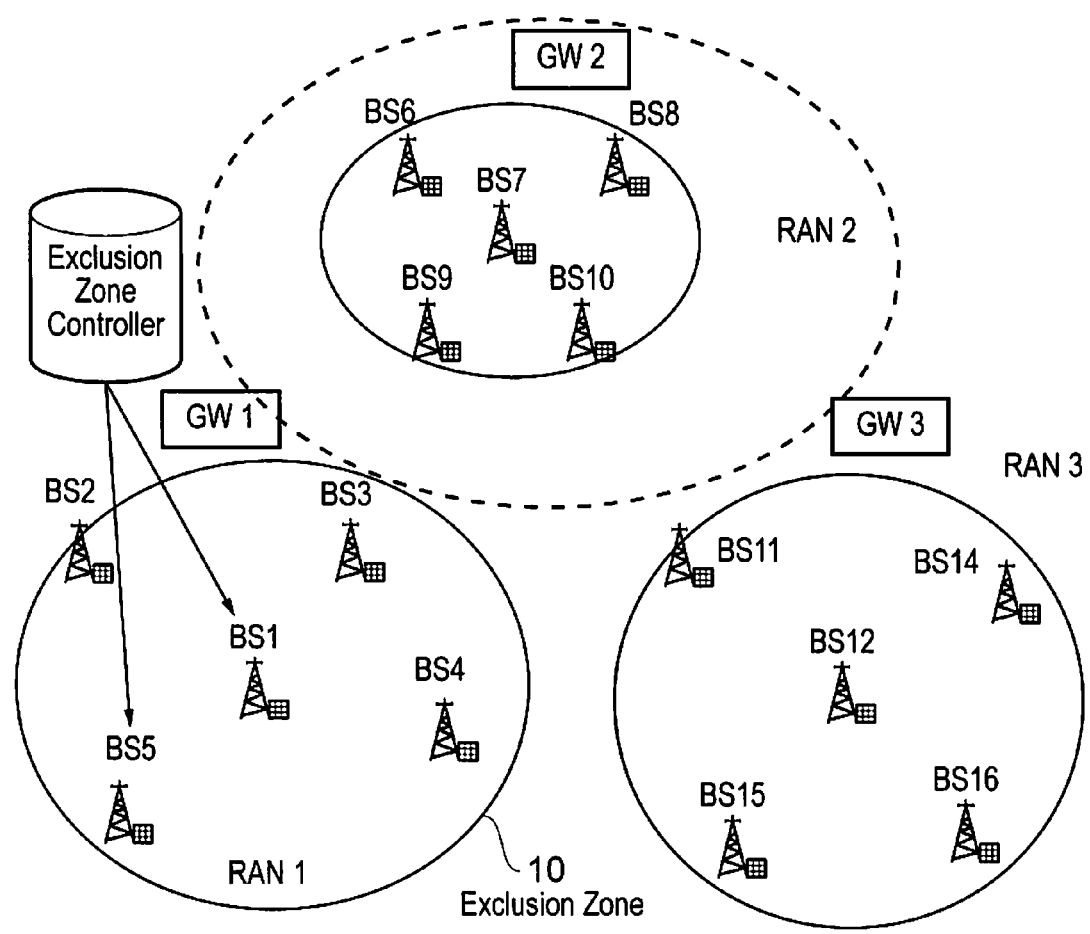
FIG. 26 illustrates the exclusion zone controller sending a request for current interference levels.

In step S1, the exclusion zone controller 12 periodically monitors the situation with the base stations that are most likely to be affected by the ongoing short term spectrum assignment negotiations. For example, in FIG. 26, the base stations BS1 and BS5 are most highly likely to be affected by the result of negotiations between the base station BS4 and the base stations BS15 or BS11. The exclusion zone controller 12 asks for the interference that the base stations BS1 and BS5 are currently experiencing in the band shared with the third radio access network RAN3, as shown in FIG. 26.

Figure 27:
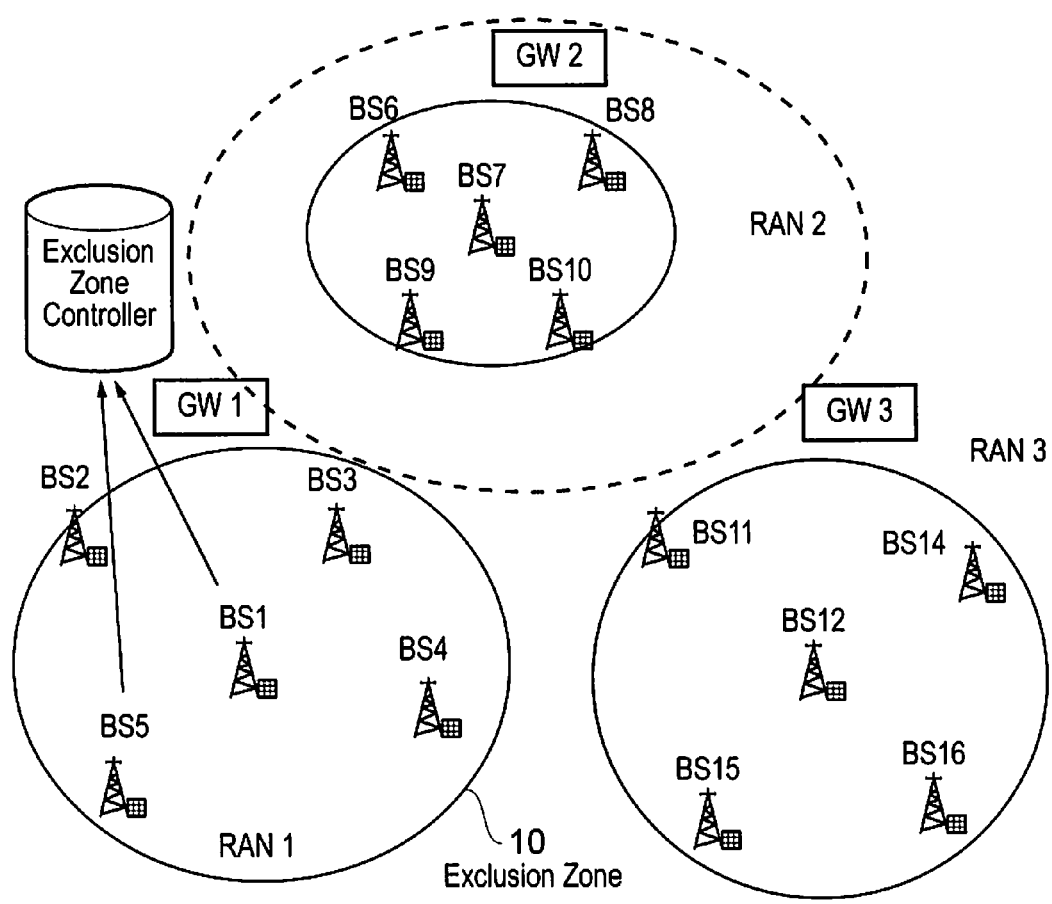
FIG. 27 illustrates the exclusion zone controller receiving the requested current interference levels.

In step S2, the base stations BS1 and BS5 send back the requested information to the exclusion zone controller 12, as shown in FIG. 27.

Figure 28:
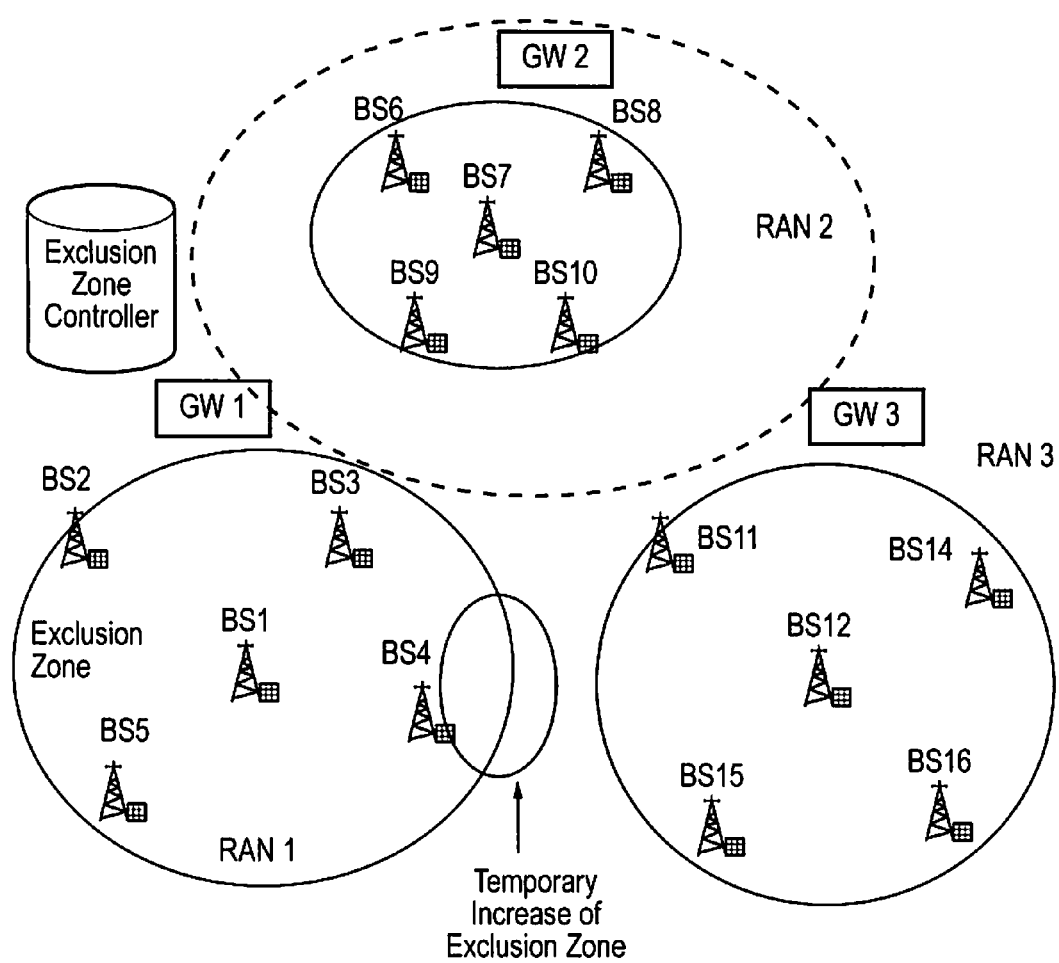
FIG. 28 illustrates an increase in the size of the exclusion zone on a localised basis, as decided by the exclusion zone controller.

In step S3, the exclusion zone controller 12 compares the interference to a threshold. In step S4, the exclusion zone controller 12 may increase the local exclusion zone size, if the interference is above a threshold, as shown in FIG. 28. Otherwise, in step S5, it decreases the local size of the exclusion zone 10.

At the end of multiple short term spectrum assignments and at the beginning of a long term spectrum assignment, the exclusion zone controller 12 may signal the latest updated local size of the exclusion zone 10 to the gateways GW1-3 and to all the higher layer network entities involved, including the entity in charge if spectrum co-existence and sharing.

With reference to FIGS. 29 to 31 and 36, in the seventh arrangement, decisions on the local size of the exclusion zone 10 are made without involving the exclusion zone controller 12.

In this arrangement, it is possible to avoid the extra signaling required to have the decision made by the exclusion zone controller 12. However, the exclusion zone controller 12 may still be made aware of the decision made locally. Avoiding reliance on the decision made by the exclusion zone controller 12 has the disadvantage of not being aware of what is going on with regard to RAN-wide with other local negotiations and local changes of exclusion zones, as the exclusion zone controller 12 has the information on this.

Figure 29:
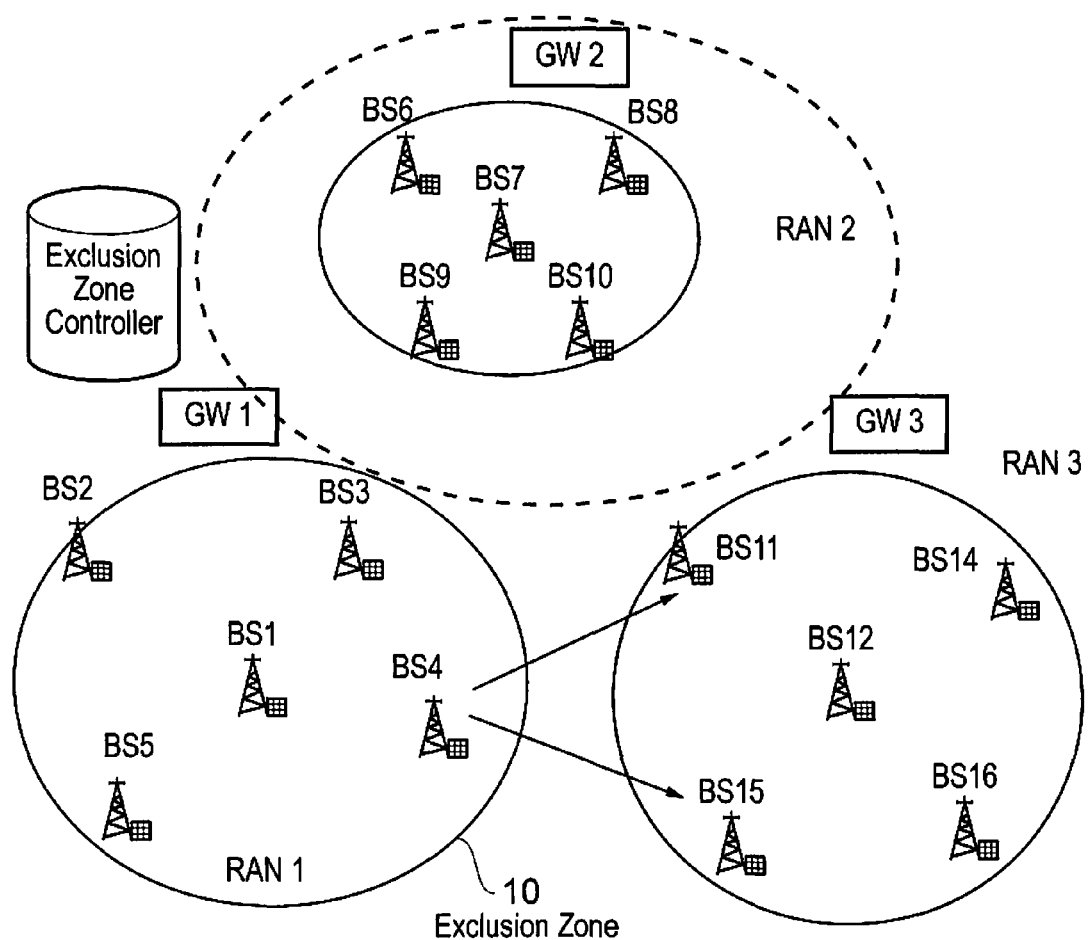
FIG. 29 illustrates localised short term exclusion zone management.

In step S1, the base station BS4 gets involved in short term spectrum assignment negotiations with base stations BS11 and BS15 of the third radio access network RAN3, as shown in FIG. 29.

In step S2, after completing the Short Term Spectrum Assignment process, the base station BS4 of the first radio access network RAN1 realises that the interference level that the base stations BS1 and BS5 receive as a result of Short Term Spectrum Assignment is not significant.

Figure 30:
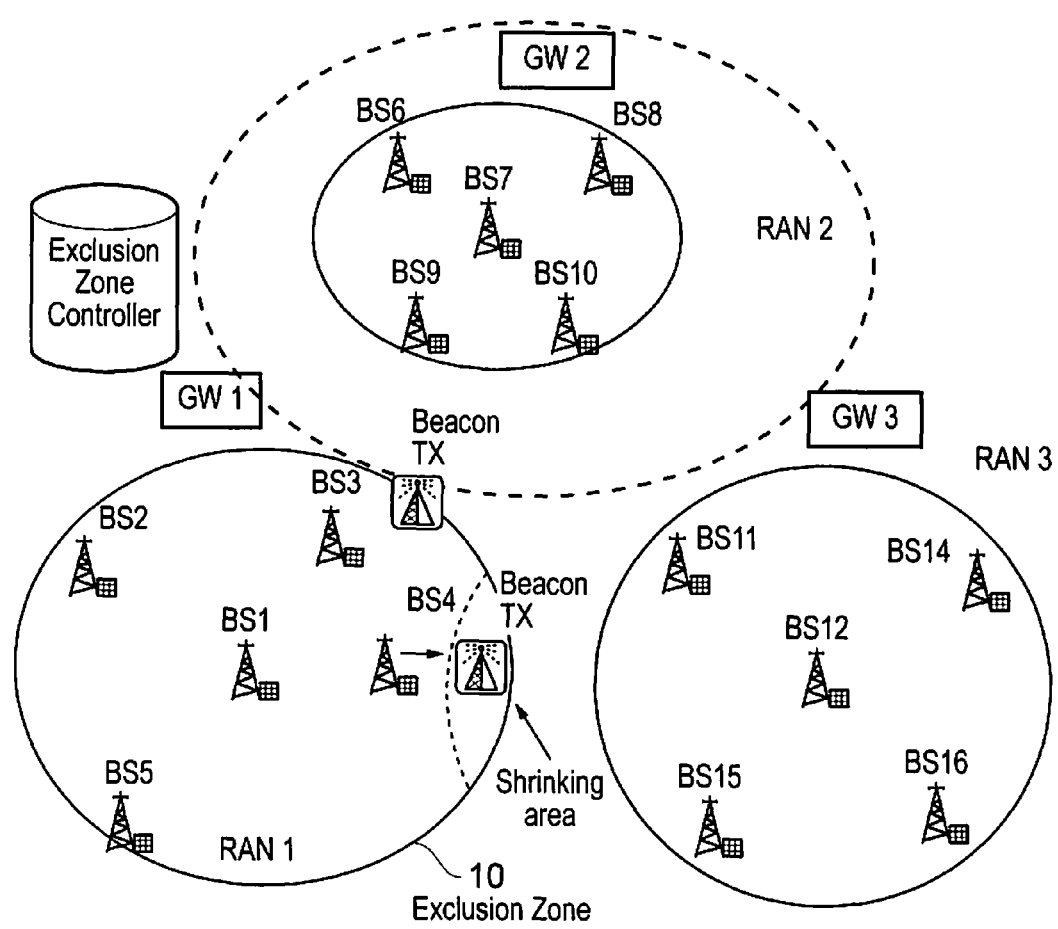
FIG. 30 illustrates shrinking the exclusion zone on a localised basis.

In step S3, the base station BS4 maps the interference level to a local size of the exclusion zone 10. If the said local size is less than the current local size, in step 4, the base station BS4 shrinks the exclusion zone 10, for example by reducing the transmission power of the local beacon signal, as shown in FIG. 30, by signaling the new beacon power level to its local beacon transmitter LB4. Otherwise, in step S5, the base station BS4 increases the local size of the exclusion zone.

Figure 31:
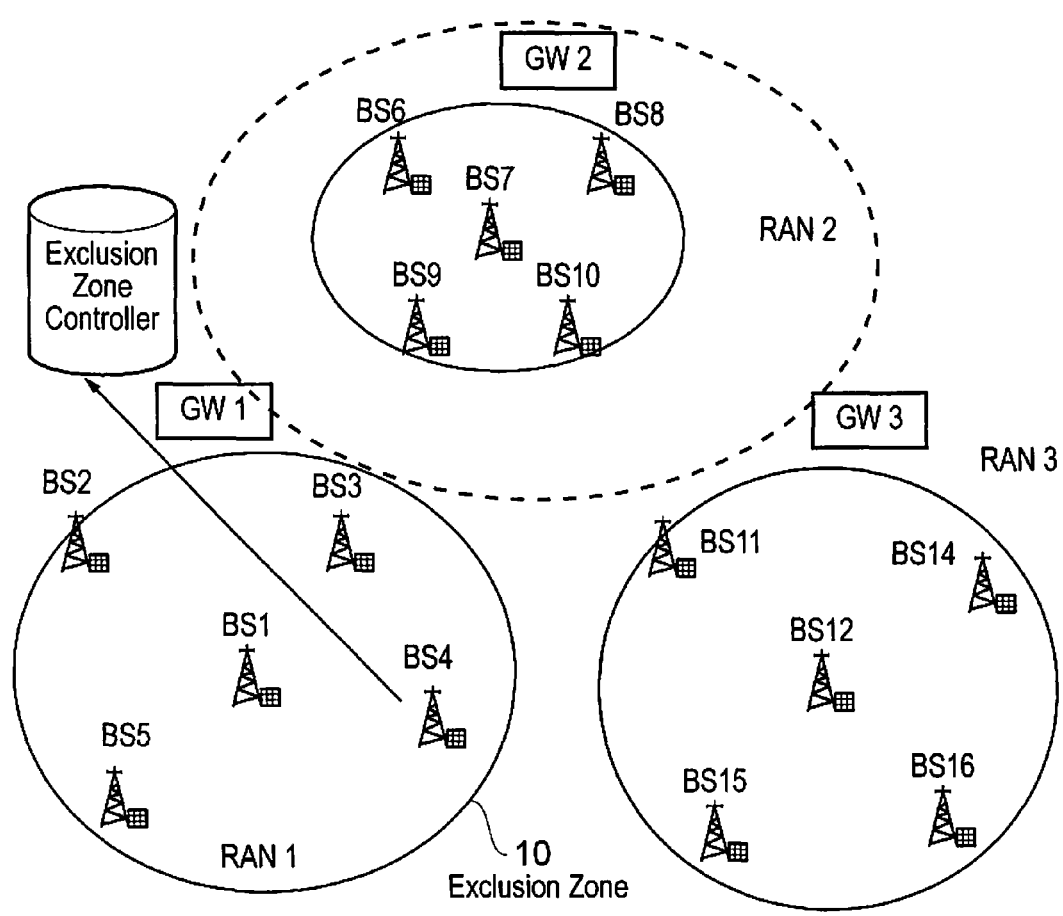
FIG. 31 illustrates localised short term exclusion zone management.
Figure 32A:
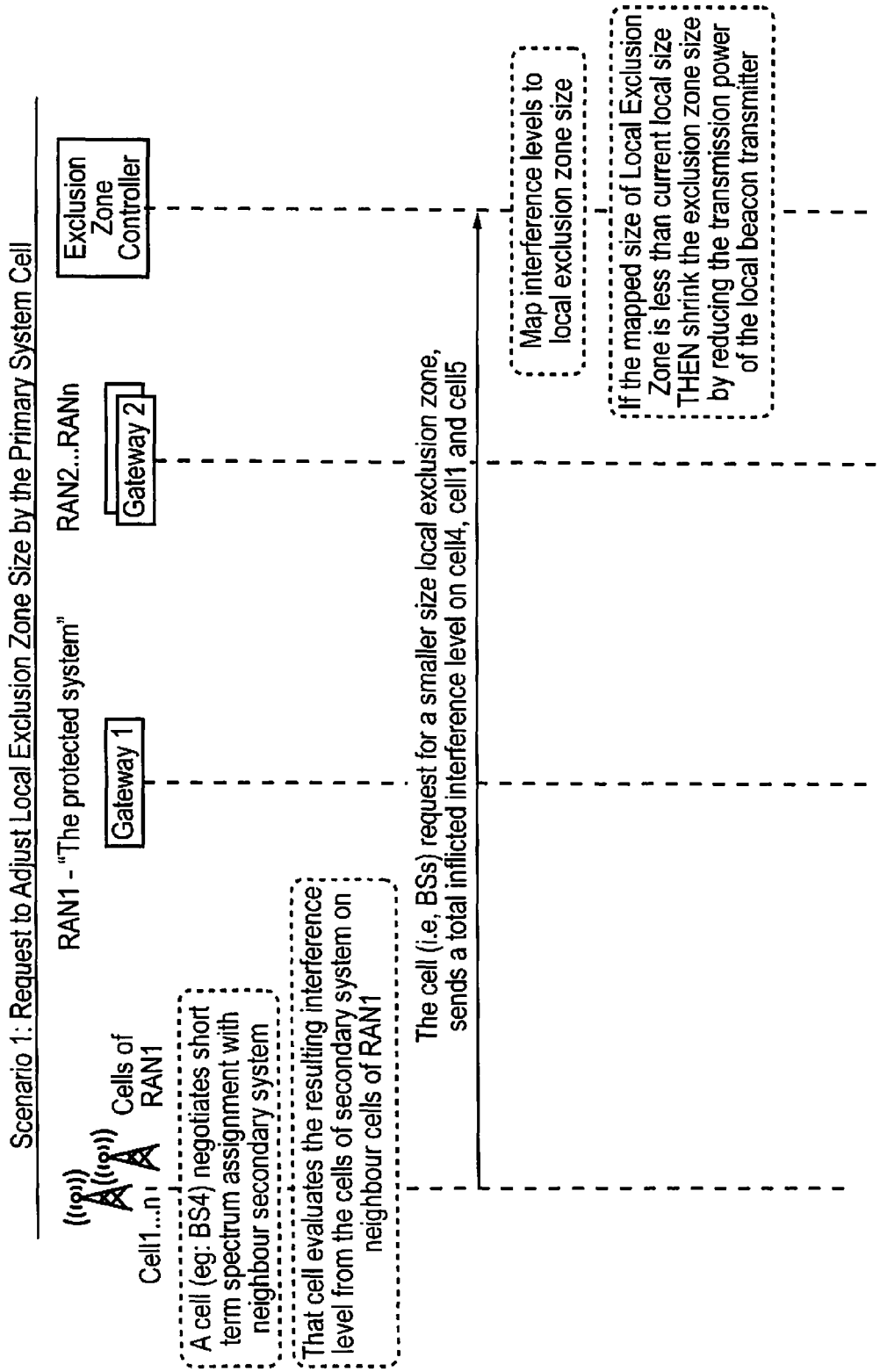
FIGS. 32A, 32B, 32C and 32D illustrate signaling which takes place in respective fourth, fifth, sixth and seventh arrangements.
Figure 32B:
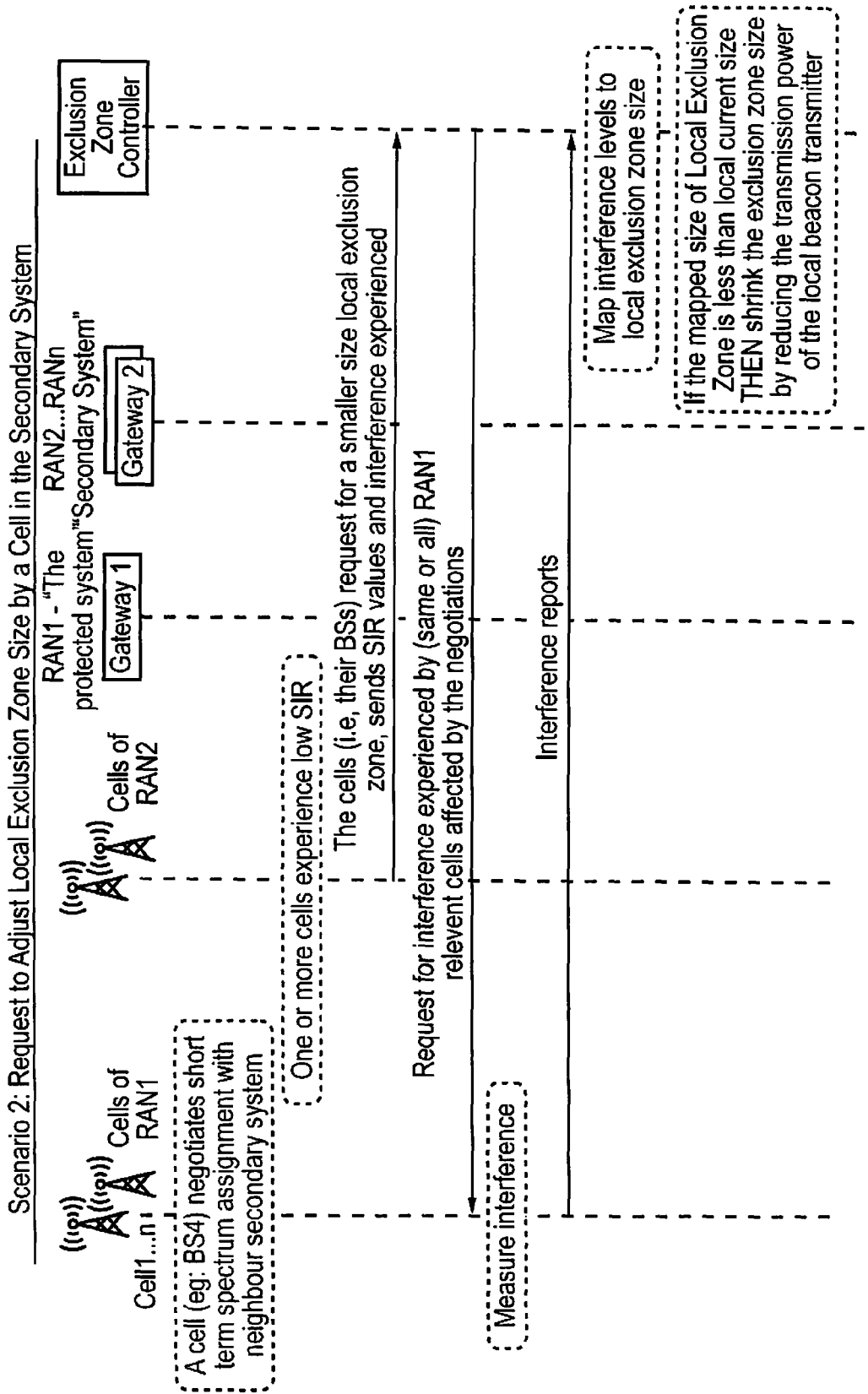
Figure 32C:
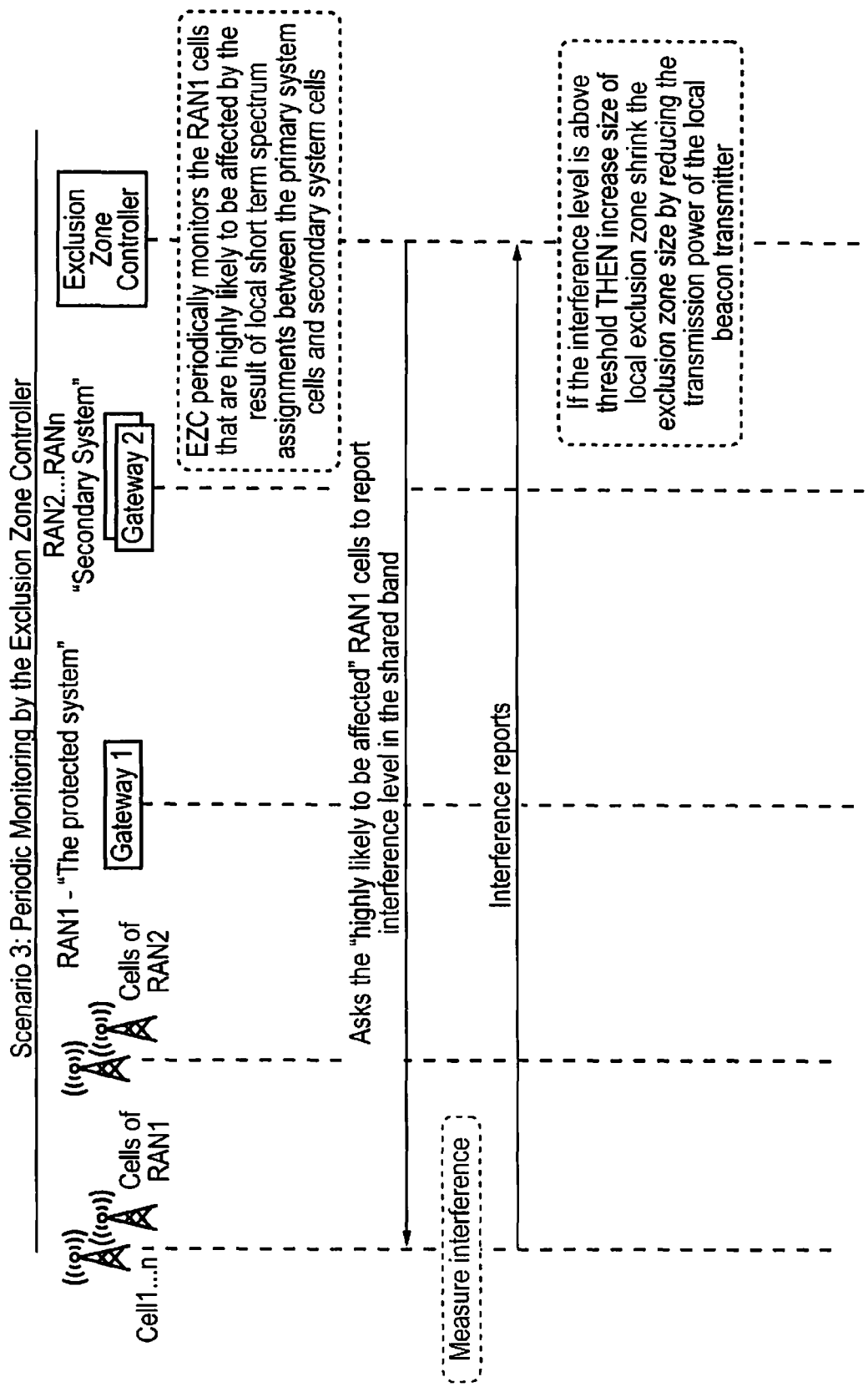
Figure 32D:
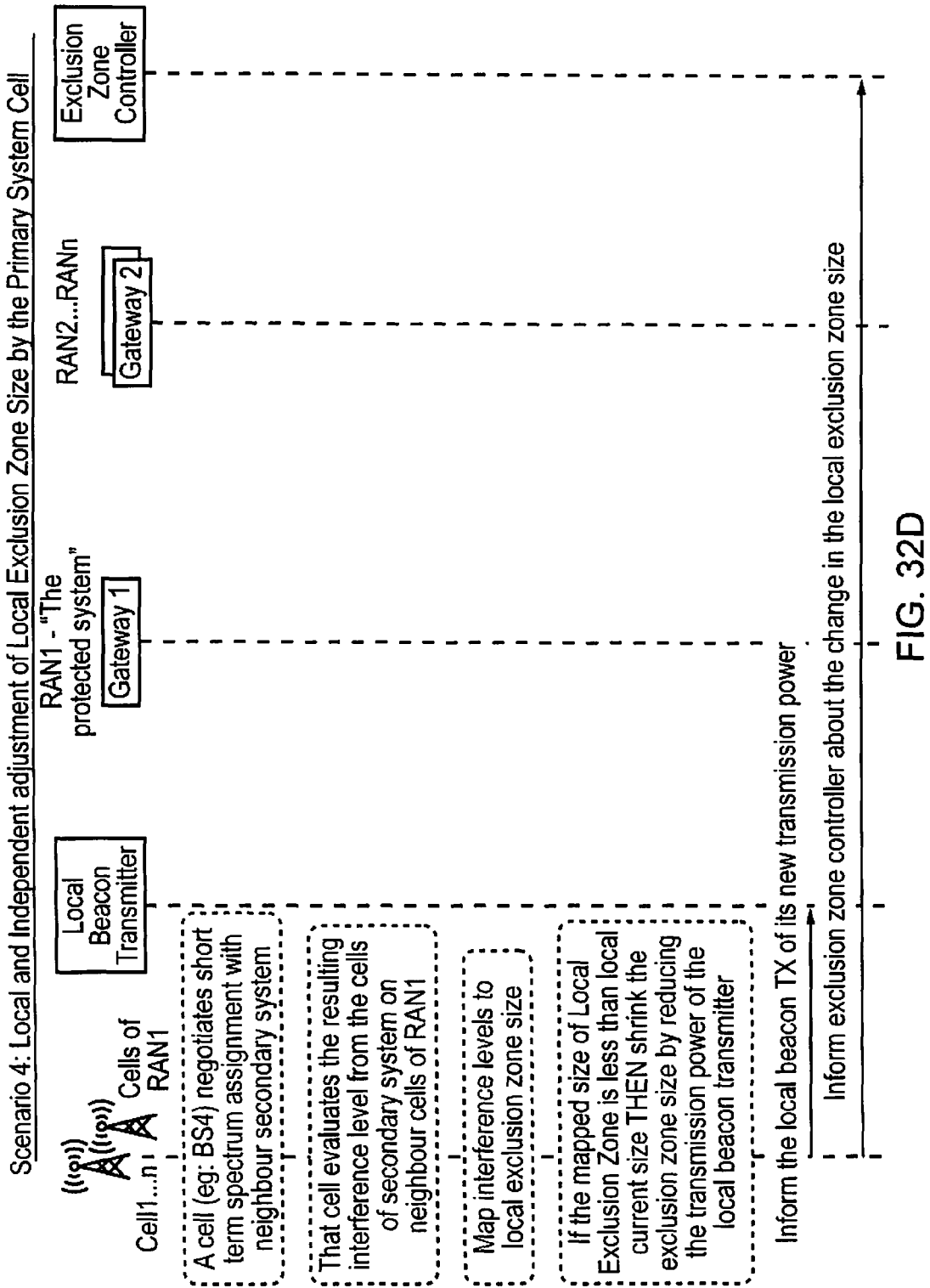
Figure 33:
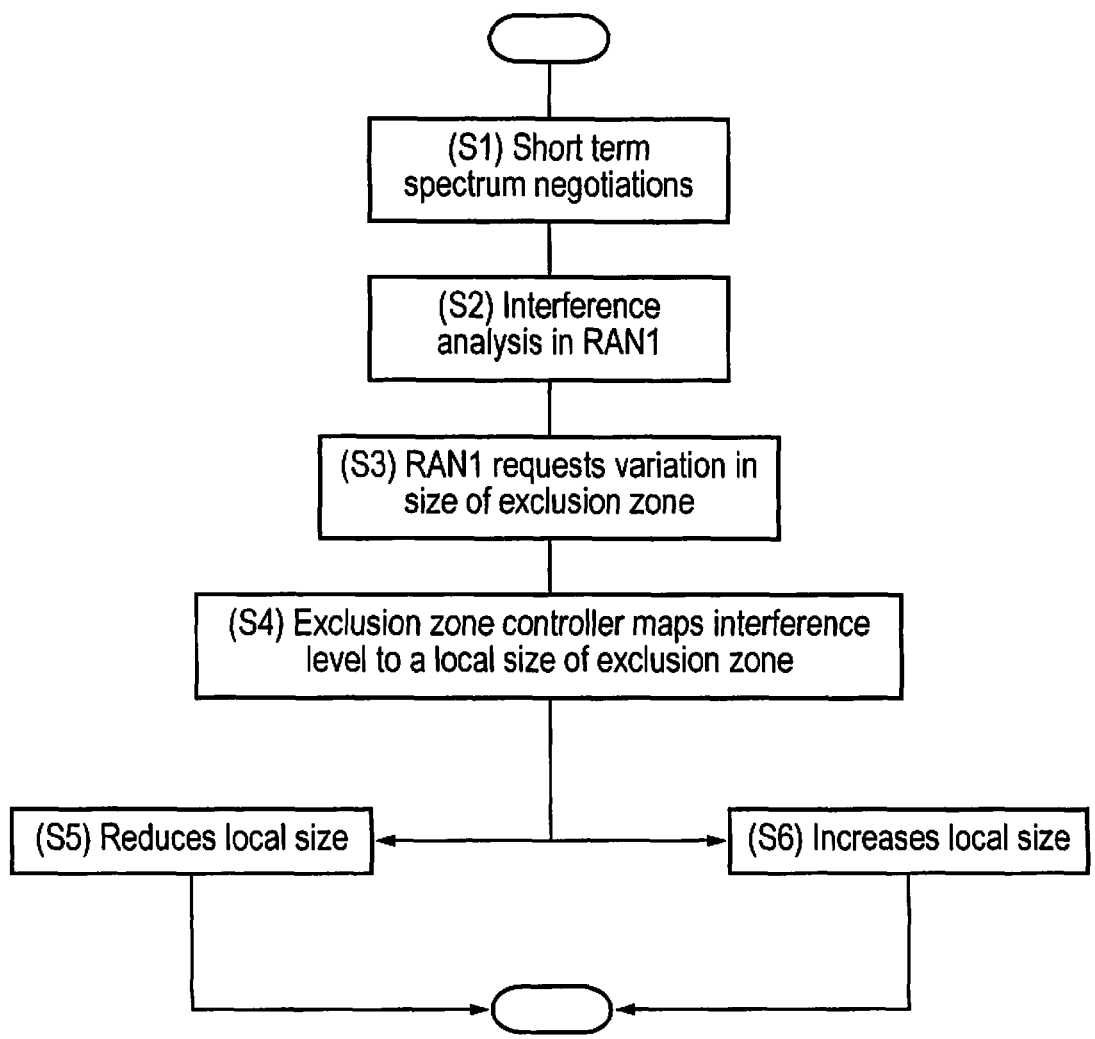
FIG. 33 is a flowchart representing a method of dynamically adjusting the size of the exclusion zone according to the fourth arrangement.
Figure 34:
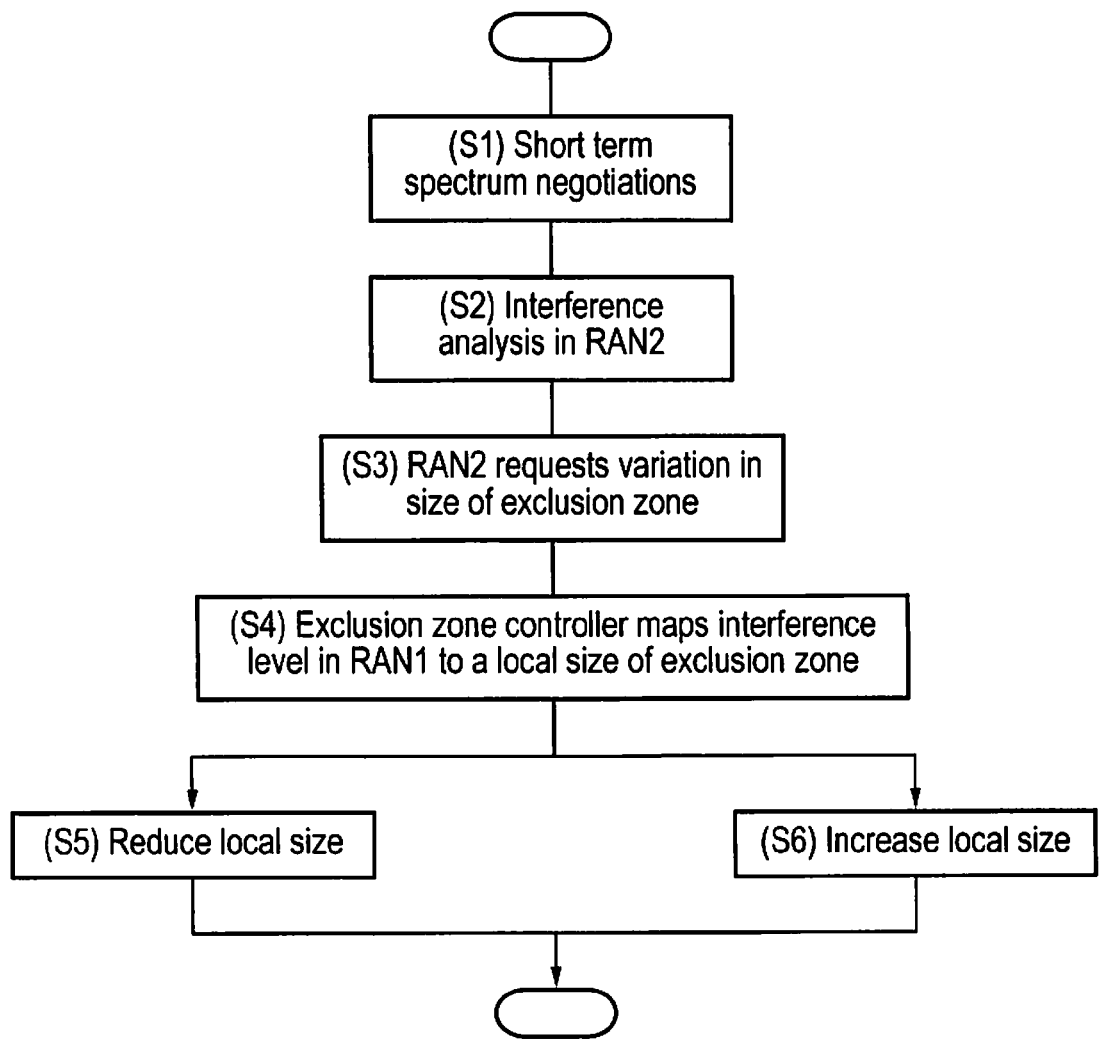
FIG. 34 is a flowchart representing a method of dynamically adjusting the size of the exclusion zone according to the fifth arrangement.
Figure 35:
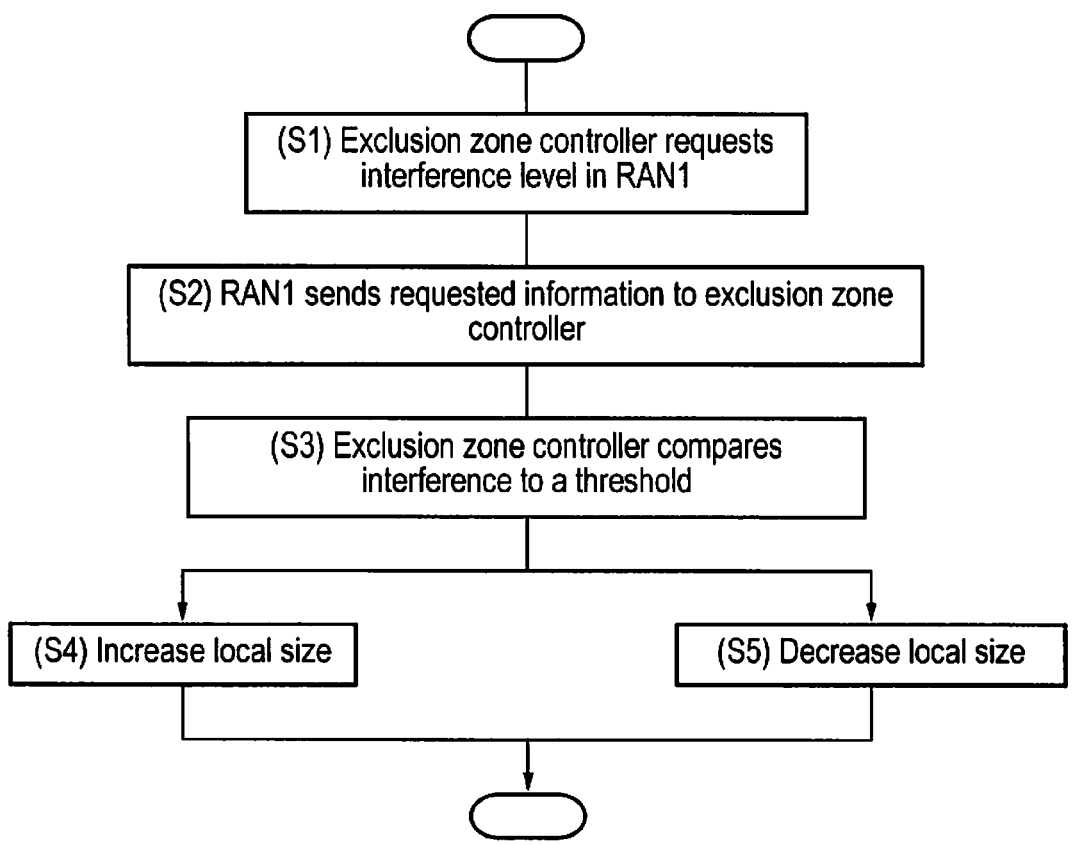
FIG. 35 is a flowchart representing a method of dynamically adjusting the size of the exclusion zone according to the sixth arrangement.
Figure 36:
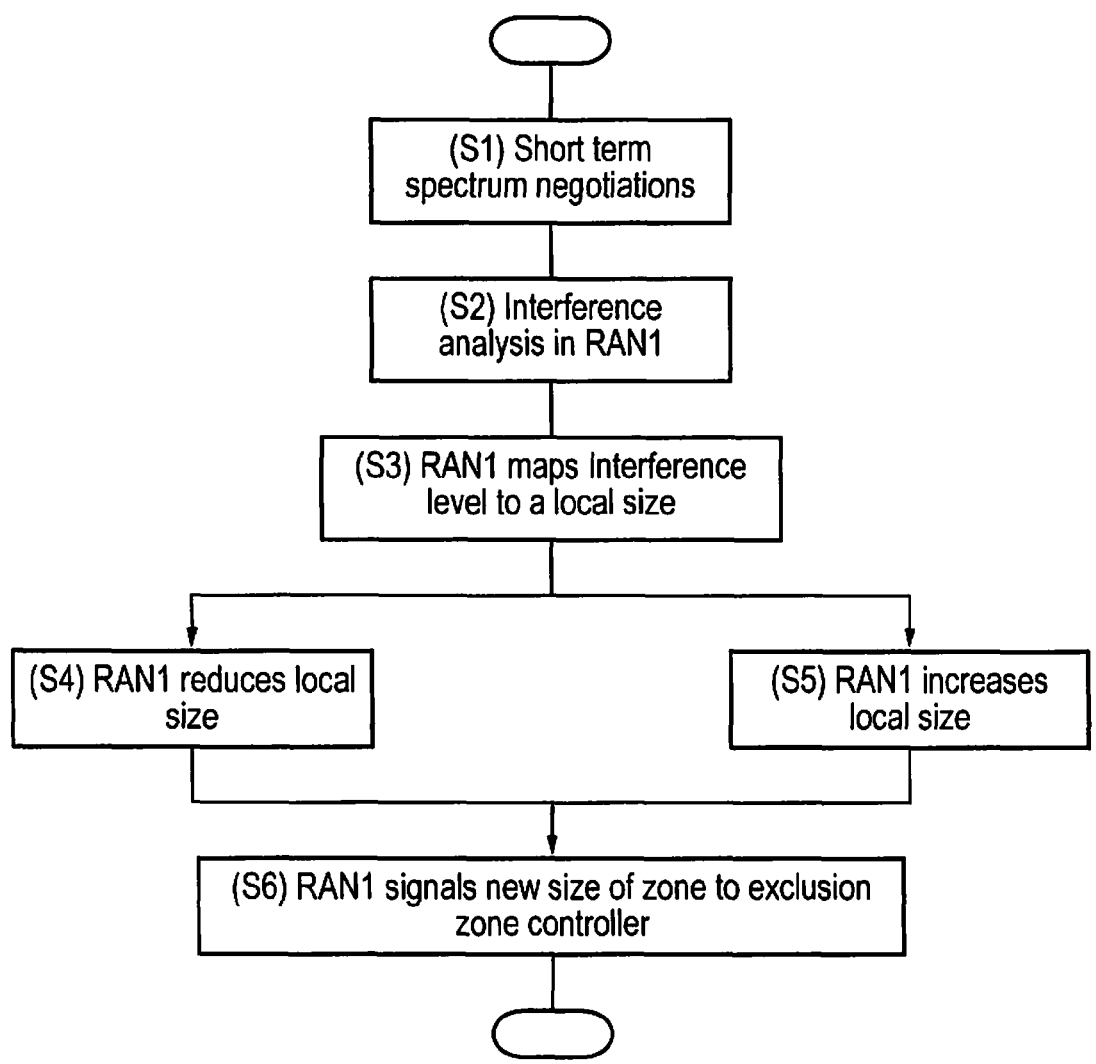
FIG. 36 is a flowchart representing a method of dynamically adjusting the size of the exclusion zone according to the seventh arrangement.

In step S6 the base station BS4 then signals the new local size of the exclusion zone 10 to the exclusion zone controller 12, as shown in FIG. 31. This is to let the exclusion zone controller 12 have an accurate idea about the current size and formation of the exclusion zone 10. Otherwise this is going to be problematic when a slow exclusion zone change is performed in line with LT Spectrum Assignment.

The relevant timing protocols for the fourth to seventh arrangements are shown respectively in FIGS. 32A-D.

Figure 37:
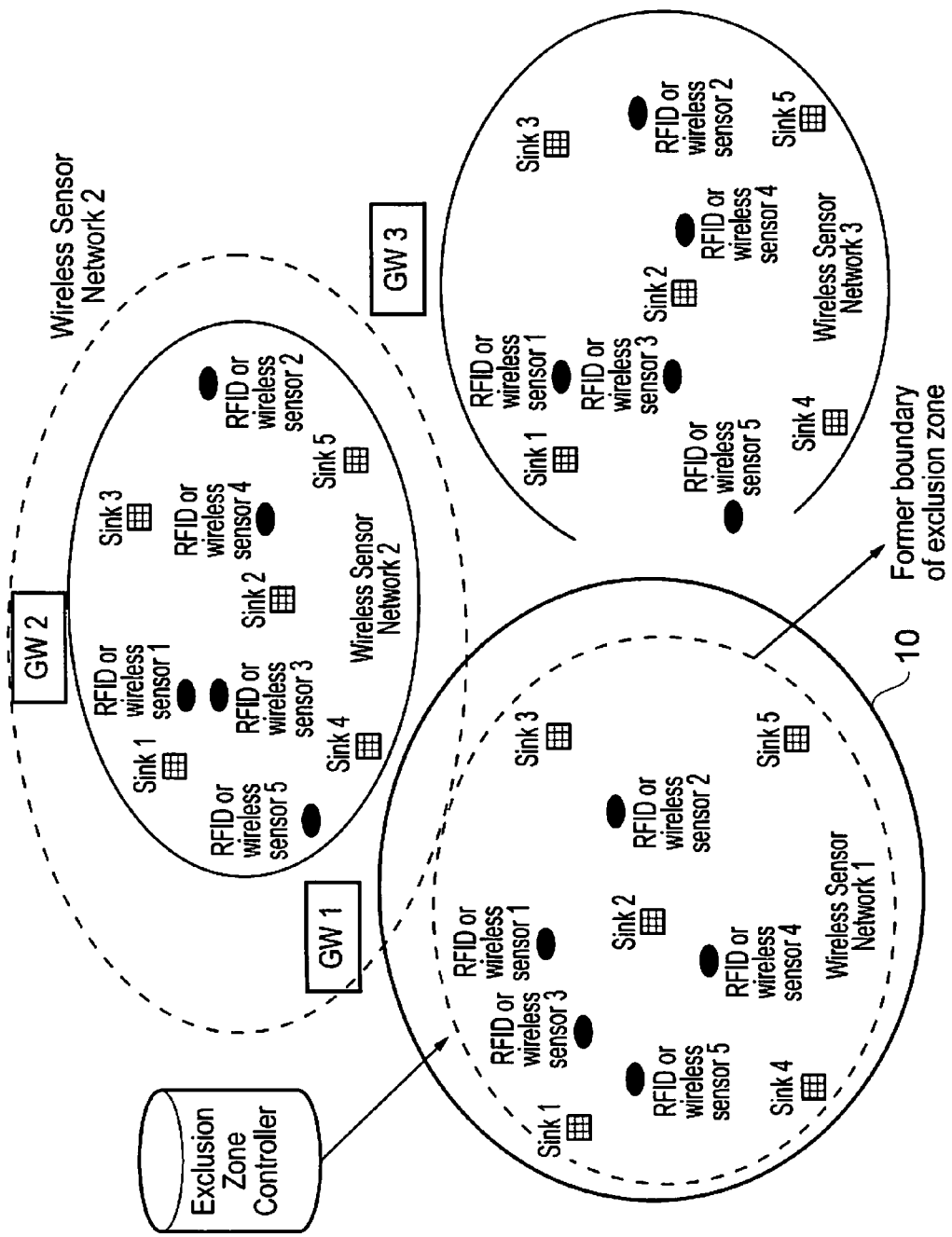
FIG. 37 illustrates a spectrum sharing scenario which involves three wireless sensor networks.

FIG. 37 illustrates a spectrum sharing scenario which involves three wireless sensor networks (RFID networks): wireless sensor network 1, wireless sensor network 2 and wireless sensor network 3. Each wireless sensor network includes a number of sinks (wireless sensor node base stations), e.g. the sinks 1-5 shown in each network in FIG. 37, and each wireless sensor network is in communication with a number of wireless sensors (RFID sensors/tags), e.g. the RFID or wireless sensors 1-5 shown in each network in FIG. 37. An exclusion shown 10 is shown surrounding the first wireless sensor network 1. The size of the exclusion zone 10 may be adjusted in any of the ways described herein, and the above disclosure applied equally to situation including wireless sensor networks as shown in FIG. 37. For example, where specific reference is made to a mobile communications apparatus or user equipment etc, that reference may be replaced with a reference to an RFID or wireless sensor node. Where specific reference is made to a base station or cell, that reference may be replaced with a reference to a sink or WSN base station, as appropriate. Where specific reference is made to a radio access network, that reference may be replaced with a reference to a wireless sensor network. Reference to an exclusion zone controller may remain unchanged.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A wireless communications method comprising:
   defining an exclusion zone in proximity to a first wireless communications system, by transmission of a system beacon signal from a gateway of the first wireless communications system, the first wireless communications system using a different radio access network from that of a second wireless communications system, the exclusion zone indicating that any user equipment within the exclusion zone is not permitted to communicate with the second wireless communications system using a portion of spectrum which has been pre-assigned to the first wireless communications system and which is currently re-assigned to the second wireless communications system by a spectrum assignment process;
   calculating a difference between a measured level of interference and a maximum acceptable level of interference inflicted on the first wireless communications system,
   controlling a local size of a part of the exclusion zone in dependence on the difference;
   transmitting from a base station of the first wireless communications system a local beacon signal, the strength of which indicates only the size of a local part of the exclusion zone, and
   adjusting the strength of the local beacon signal in order to control the local size of the part of the exclusion zone.

2. The method of claim 1 further comprising:
   storing a mapping table of the level of interference against the local size of the part of the exclusion zone, and using the mapping table to control the local size of the part of the exclusion zone in dependence on the difference.

3. The method of claim 1 wherein controlling the local size of the part of the exclusion zone comprises varying the size of the exclusion zone non-uniformly around the perimeter of the exclusion zone.

4. The method of claim 1 wherein controlling the local size of the part of the exclusion zone comprises moving one or more portions of the perimeter of the exclusion zone towards or away from a central region of the exclusion zone.

5. The method of claim 4 further comprising:
   moving the one or more portions independently of other portions of the perimeter.

6. The method of claim 1 wherein controlling the local size of the part of the exclusion zone comprises dynamically varying the local size.

7. A method of operating a controller for use with a wireless communications system comprising:
   receiving a signal which is indicative of a level of interference inflicted on a first wireless communications system, the first wireless communications system having first wireless communications system base stations serving user equipments and a gateway;
   calculating a difference between the level of interference inflicted on the first wireless communications system and a maximum acceptable level of interference;
   controlling a size of a part only of an exclusion zone in dependence on the difference, the exclusion zone indicating that any user equipment within the exclusion zone is not permitted to communicate with a second wireless communications system using a portion of spectrum which was pre-assigned to the first wireless communications system and which is currently re-assigned to the second wireless communications system by a spectrum assignment process; and
   transmitting to the first wireless communication system a control signal which is indicative of the size of the exclusion zone, wherein the control signal is indicative of a system beacon signal transmitted from the gateway of the first wireless communication system to establish the exclusion zone in proximity to the first wireless communication system, and wherein the control signal further indicates the power of a local beacon signal transmitted from a base station of the first wireless communication system and the strength of the local beacon signal is adjusted in order to control only the local size of the part of the exclusion zone.

8. The method of claim 7 further comprising:
   storing a mapping table of the level of interference against the local size of the part of the exclusion zone, and using the mapping table to control the local size of the part of the exclusion zone.

9. The method of claim 7 wherein the controlling a local size of the part of the exclusion zone comprises determining a variation in the size of the exclusion zone which is non-uniform around the perimeter of the exclusion zone.

10. The method of claim 7 wherein the controlling a local size of the part of the exclusion zone comprises determining a movement of one or more portions of the perimeter of the exclusion zone towards or away from a central region of the exclusion zone.

11. The method of claim 10 further comprising:
    determining the movement of the said one or more portions independently of other portions of the perimeter.

12. A first wireless communication system comprising: a gateway and a plurality of base stations configured to serve a plurality of user equipment, wherein the gateway comprises:
    exclusion zone circuitry configured to define an exclusion zone in proximity to the first wireless communications system by transmission of a system beacon signal, the first wireless communication system using a different radio access network from that of a second wireless communications system, the exclusion zone indicating that any user equipment within the exclusion zone is not permitted to communicate with the second wireless communications system using a portion of spectrum which has been pre-assigned to the first wireless communications system and which is currently re-assigned to the second wireless communications system by a spectrum assignment process; and wherein one or more of the plurality of base stations comprises:

beacon circuitry configured to transmit a local beacon signal, the strength of which indicates only the size of a local part of the exclusion zone;

wherein the first wireless communications system is further configured to calculate a difference between a measured level of interference inflicted on the first wireless communications system and a maximum acceptable level of interference;

control a local size of a part of the exclusion zone in dependence on the difference; and wherein the one or more base stations are configured to adjust the strength of the local beacon signal in order to control the local size of the part of the exclusion zone.

13. The apparatus of claim 12 further comprising:

memory circuitry configured to store a mapping table of the level of interference against the local size of the part of the exclusion zone, wherein the exclusion zone circuitry is configured to use the mapping table to control the local size of the part of the exclusion zone in dependence on the level of interference.

14. The apparatus of claim 12 wherein the exclusion zone circuitry is configured to control the size of the exclusion zone non-uniformly around the perimeter of the exclusion zone.

15. The apparatus of claim 12 wherein the exclusion zone circuitry is configured to move one or more portions of the perimeter of the exclusion zone towards or away from a central region of the exclusion zone.

16. The apparatus of claim 15 wherein the exclusion zone circuitry is configured to move the one or more portions independently of other portions of the perimeter.

17. The apparatus of claim 12 wherein the exclusion zone circuitry is configured to control the local size dynamically.

18. A controller for use with a first wireless communications system, the first wireless communications system having first wireless communications system base stations serving user equipments and a gateway, the controller comprising:

communications circuitry configured to determine the desired size of an exclusion zone and to transmit to the first wireless communications system a desired power of a system beacon signal defining the exclusion zone, wherein the system beacon signal is transmitted from the gateway;

communications circuitry configured to receive a signal which is indicative of a level of interference inflicted on a first wireless communications system;

control circuitry configured to determine a difference between the level of interference inflicted on the first wireless communications system and a maximum acceptable level of interference, and configured to control a local size of a part of an exclusion zone based on the difference;

wherein the communications circuitry is configured to transmit to the first wireless communications system a signal which is indicative of the size of part of the exclusion zone wherein the signal indicates the power of a local beacon signal transmitted from the base station of the first wireless communication system and the strength of the local beacon signal is adjusted in order to control only the local size of the part of the exclusion zone, wherein the exclusion zone indicating that any user equipment located within the exclusion zone is not permitted to communicate with a second wireless communications system using a portion of spectrum which has been pre-assigned to the first wireless communications system and which is currently re-assigned to the second wireless communications system by a spectrum assignment process.

19. The controller of claim 18 further comprising:

memory circuitry configured to store a mapping table of the level of interference against the local size of the part of the exclusion zone, wherein the control circuitry is configured to use the mapping table to determine the local size of the part of the exclusion zone.

20. The controller of claim 18 wherein the control circuitry is configured to determine a variation in the size of the exclusion zone which is non-uniform around the perimeter of the exclusion zone.

21. The apparatus of claim 18 wherein the control circuitry is configured to determine a movement of one or more portions of the perimeter of the exclusion zone towards or away from a control region of the exclusion zone.

22. The apparatus of claim 21 wherein the control circuitry is configured to determine the movement of the said one or more portions independently of other portions of the perimeter.

23. A non-transitory computer-readable medium storing a computer program which, when run on a computer, causes the computer to perform the method of claim 1.

24. A non-transitory computer-readable medium storing a computer program which, when run on a computer, causes the computer to perform the method of claim 7.

* * * * *